(12) United States Patent
Woo

(10) Patent No.: US 11,984,647 B2
(45) Date of Patent: May 14, 2024

(54) ELECTRONIC DEVICE INCLUDING ANTENNA

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 17/797,401

(22) PCT Filed: Feb. 4, 2020

(86) PCT No.: PCT/KR2020/001609
§ 371 (c)(1),
(2) Date: Aug. 3, 2022

(87) PCT Pub. No.: WO2021/157751
PCT Pub. Date: Aug. 12, 2021

(65) Prior Publication Data
US 2023/0079358 A1    Mar. 16, 2023

(51) Int. Cl.
*H01Q 1/24*    (2006.01)
*H01Q 1/38*    (2006.01)
(Continued)

(52) U.S. Cl.
CPC .............. *H01Q 1/243* (2013.01); *H01Q 1/38* (2013.01); *H01Q 1/46* (2013.01); *H04B 1/401* (2013.01)

(58) Field of Classification Search
CPC ............ H01Q 1/243; H01Q 1/38; H01Q 1/46; H01Q 5/371; H01Q 19/108; H01Q 21/10;
(Continued)

(56) References Cited

U.S. PATENT DOCUMENTS

| 2011/0057853 A1* | 3/2011 | Kim | H01Q 9/0442 343/846 |
| 2012/0038526 A1* | 2/2012 | Lim | H01Q 9/0407 343/700 MS |
| 2016/0043470 A1* | 2/2016 | Ko | H01Q 21/28 343/893 |

FOREIGN PATENT DOCUMENTS

| KR | 20110026654 | 3/2011 |
| KR | 20120015163 | 2/2012 |
(Continued)

OTHER PUBLICATIONS

Korean Intellectual Property Office Application No. 10-2022-7012942, Notice of Allowance dated Oct. 12, 2023, 6 pages.
(Continued)

*Primary Examiner* — David E Lotter
(74) *Attorney, Agent, or Firm* — LEE, HONG, DEGERMAN, KANG & WAIMEY

(57) ABSTRACT

An electronic device including an antenna, according to one embodiment, is provided. The electronic device can comprise: a first radiator in which metal patterns having a predetermined width and length are stacked on different layers of a multi-layer substrate; and a second radiator in which metal patterns having a predetermined width and length are stacked on top of the first radiator. The electronic device can further comprise a transceiver circuit for connecting to any one metal pattern from among the first radiator and the second radiator through a feeding line.

10 Claims, 29 Drawing Sheets

(51) Int. Cl.
*H01Q 1/46* (2006.01)
*H04B 1/401* (2015.01)

(58) Field of Classification Search
CPC .......... H01Q 21/28; H04B 1/401; H04B 1/00;
H04B 1/40; H04M 1/02
See application file for complete search history.

(56) References Cited

FOREIGN PATENT DOCUMENTS

| KR | 20160016465 | 2/2016 |
| KR | 1020170016377 | 2/2017 |

OTHER PUBLICATIONS

PCT International Application No. PCT/KR2020/001609, International Search Report dated Oct. 27, 2020, 4 pages.
"5G Millimeter Wave Frequencies and Mobile Networks", IWPC 5G mmWave Mobility White Paper Version 1, Jun. 2019, <http://www.skyworksinc.com/-/media/SkyWorks/Documents/Articles/IWPC_062019.pdf>, 204 pages.
Junho Park, et al., "28 GHz 5G Dual-Polarized End-fire Antenna with Electrically-Small Profile", ResearchGate, DOI: 10.1049/cp.2018.0882, Jul. 2019, <http://www.researchgate.net/publication/329077347>, 6 pages.

\* cited by examiner (a)

(b)

(a)

(b)

(c)

E-field is radiated outwardly

Same direction (a) Current direction is same between two conductors

E-field is bound between two conductors

Opposite direction (b) Current direction is different between two conductors

ELECTRONIC DEVICE INCLUDING ANTENNA

CROSS-REFERENCE TO RELATED APPLICATIONS

This application is the National Stage filing under 35 U.S.C. 371 of International Application No. PCT/KR2020/001609, filed on Feb. 4, 2020, the contents of which are all incorporated by reference herein in its entirety.

TECHNICAL FIELD

The present disclosure relates to an electronic device including a 5G antenna. A specific implementation relates to an antenna module in which an array antenna operating in a millimeter wave band is disposed.

BACKGROUND ART

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some terminals include additional electronic game play functions or perform a multimedia player function. Specifically, in recent years, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Meanwhile, a 28 GHz band, a 38.5 GHz band, and a 64 GHz band are being considered as frequency bands to be allocated for 5G communication services in such a mmWave band. In this regard, a plurality of array antennas in the millimeter wave band may be disposed in the electronic device.

In this regard, an array antenna capable of operating in a millimeter wave (mmWave) band needs to operate in a wide band to cover one or more bands. In this regard, there is a problem in that it is difficult to design an antenna structure that operates in a wide band to cover a plurality of bands such as a 28 GHz band and a 38.5 GHz band with one antenna.

DISCLOSURE OF INVENTION

Technical Problem

An aspect of the present disclosure is to solve the foregoing and other problems. Furthermore, another aspect of the present disclosure is to provide an electronic device including an antenna module in which an array antenna operating in a millimeter wave band is disposed and a configuration controlling the same.

Still another aspect of the present disclosure is to provide an antenna structure that operates in a wide band to cover a plurality of bands in a millimeter wave band with one antenna.

Yet still another aspect of the present disclosure is to propose an antenna structure that operates as a notch filter in a band between a plurality of bands in a millimeter wave band.

Still yet another aspect of the present disclosure is to perform multi-input multi-output (MIMO) using an antenna structure that operates in a wide band to cover a plurality of bands in a millimeter wave band with one antenna.

Solution to Problem

In order to achieve the foregoing or other objectives, an electronic device including an antenna according to an embodiment is provided. The electronic device including an antenna, the electronic device may include a first radiator configured by stacking metal patterns having a predetermined width and length on different layers of a multi-layer substrate; and a second radiator configured by stacking metal patterns having a predetermined width and length above the first radiator. The electronic device may further include a transceiver circuit configured to be connected to any one metal pattern of the first radiator and the second radiator through a feeding line.

According to an embodiment, the metal patterns of the first radiator corresponding to a lower radiator may be configured with metal patterns spaced apart from each other by a predetermined distance for each layer. The metal patterns of the second radiator corresponding to an upper radiator may be configured with metal patterns spaced apart from each other by a predetermined distance for each layer.

According to an embodiment, a metal pattern disposed at an upper portion of the first radiator and a metal pattern disposed at a lower portion of the second radiator may be interconnected by a vertical via.

According to an embodiment, the metal patterns of adjacent layers of the first radiator may be interconnected by first vertical vias spaced apart from each other by a predetermined distance.

According to an embodiment, the metal patterns of adjacent layers of the second radiator may be interconnected by second vertical vias spaced apart from each other by a predetermined distance.

According to an embodiment, the first vertical vias may be configured to connect the metal patterns of adjacent layers in one axial direction and the other axial direction perpendicular to the one axial direction. The second vertical vias may be configured to connect the metal patterns of adjacent layers in one axial direction and the other axial direction perpendicular to the one axial direction.

According to an embodiment, the feeding line may be connected to one of first metal patterns disposed on an uppermost layer of the first radiator.

According to an embodiment, a ground line may be connected to any one of second metal patterns disposed under the first metal patterns.

An end portion of the feeding line may be connected to a first metal pattern disposed at one side of the first metal patterns. An end portion of the ground line may be connected to a second metal pattern disposed at the other side of the second metal patterns.

According to an embodiment, the first metal patterns and the feeding line may be disposed on a first layer that is an uppermost layer of the multi-layer circuit substrate. The ground line corresponding to the feeding line may be disposed on a second layer that is a layer adjacent to the uppermost layer of the multi-layer circuit substrate.

According to an embodiment, the electronic device may further include a ground wall configured to connect the multi-layer circuit substrate, and spaced apart from the first radiator by a predetermined distance. A height of the ground wall may be defined to be higher than that of the multi-layer circuit substrate.

A length of the metal patterns disposed on each layer of the first radiator may be disposed to have a first length. A length of the metal patterns disposed on each layer of the second radiator may be disposed to have a second length larger than the first length.

According to an embodiment, the metal patterns disposed on each layer of the first radiator may be all disposed to have a first length that is the same length. The metal patterns disposed on each layer of the second radiator may be all disposed to have a second length that is the same length.

According to an embodiment, an antenna element including the first radiator and the second radiator may be configured to operate in a first band and a second band higher than the first band. A current intensity formed in the metal patterns of the first radiator that is a lower radiator in the first band may be distributed to be higher than that formed in the metal patterns of the second radiator that is an upper radiator. A current intensity formed in the metal patterns of the second radiator in the second band may be distributed to be higher than that formed in the metal patterns of the first radiator.

According to an embodiment, an antenna element including the first radiator and the second radiator may constitute an array antenna in which a plurality of antenna elements are disposed to be spaced apart from each other by a predetermined distance.

According to an embodiment, the electronic device may further include a baseband processor operatively coupled to the transceiver circuit and configured to control a phase of a signal applied to each antenna element of the array antenna via the transceiver circuit.

There is provided an antenna module provided in an electronic device according to another aspect of the present disclosure. The antenna module may include a lower radiator configured by stacking metal patterns having a predetermined width and length on different layers of a multi-layer substrate; and an upper radiator configured by stacking metal patterns having a predetermined width and length above the first radiator. The antenna module may further include a feeding line disposed on any one layer of the multi-layer circuit substrate, and configured to be connected to a metal pattern disposed on any one layer of the lower radiator.

Advantageous Effects of Invention

The technical effects of an array antenna operating in such a millimeter wave band and an electronic device controlling the same will be described as follows.

According to an embodiment, an electronic device including an antenna module in which an array antenna operating in a millimeter wave band is disposed, a transceiver circuit controlling the same, and a modem may be provided.

Another aspect of the present disclosure is to provide an antenna structure in which an upper radiator and a lower radiator are disposed to have different lengths and are connected by vertical vias to operate in a wide band so as to cover a plurality of bands in a millimeter wave band with one antenna.

According to an embodiment, an antenna structure that operates as a notch filter in a band between a plurality of bands in a millimeter wave band using an upper radiator and a lower radiator connected by vertical vias.

According to an embodiment, multi-input multi-output (MIMO) may be performed using an antenna structure that operates in a wide band to cover a plurality of bands in a millimeter wave band with one antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
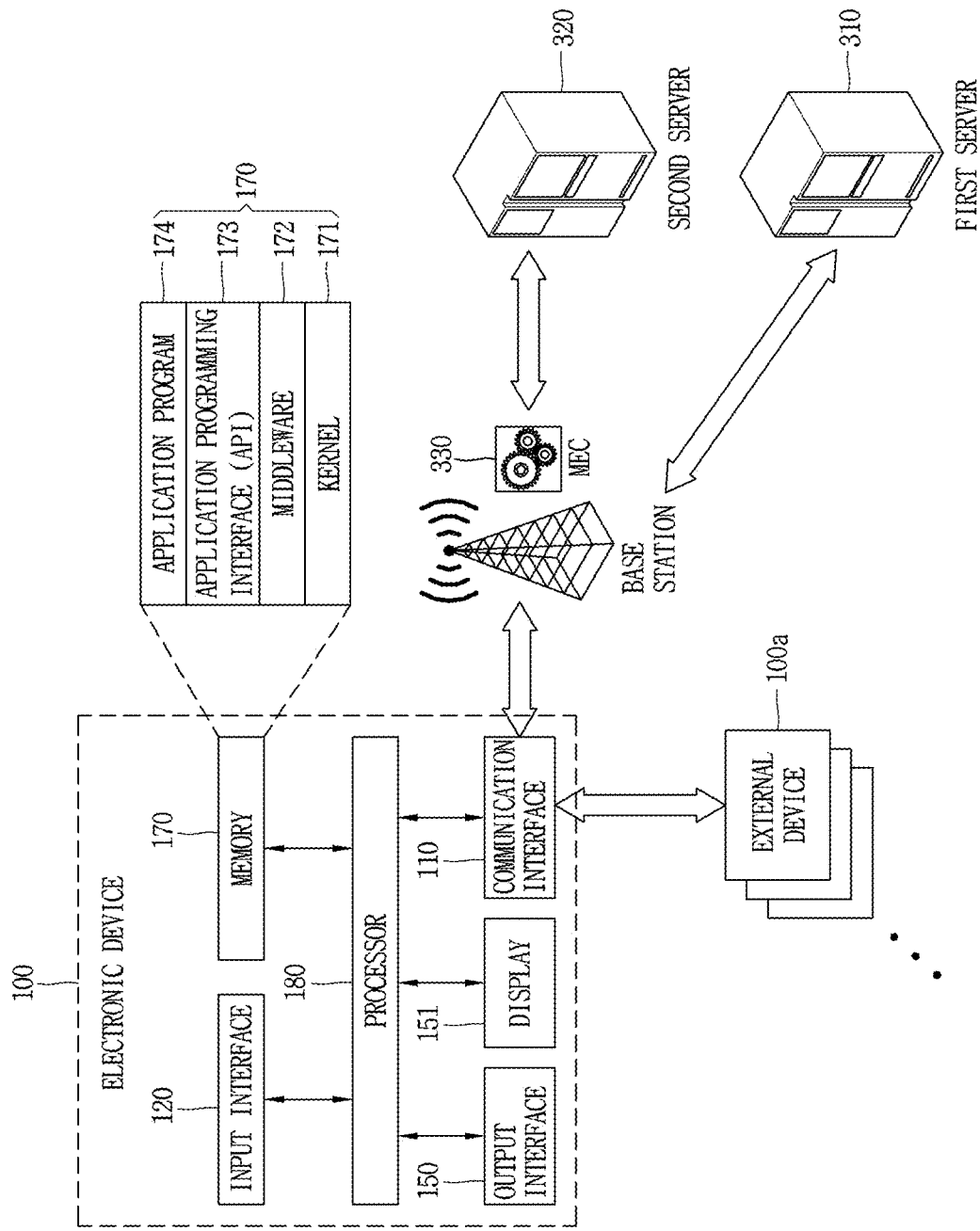
FIG. 1 shows a configuration for explaining an electronic device according to an embodiment and an interface between the electronic device and an external device or a server.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer elements, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the embodiments of this specification can also be applied to stationary terminals such as digital TV, desktop computers, digital signages, and the like, excluding a case of being applicable only to the mobile terminals.

Figure 2A:
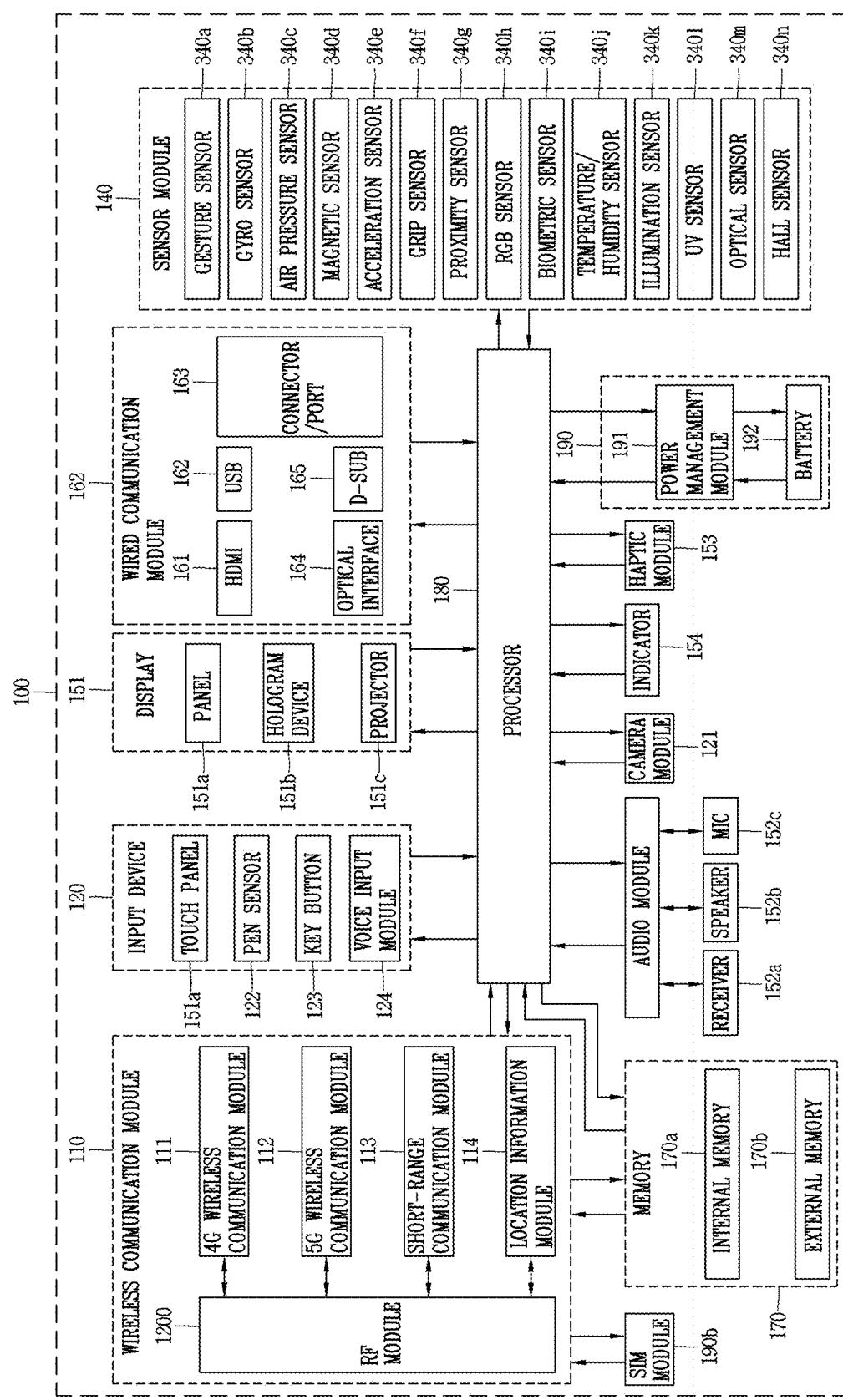
FIG. 2A shows a detailed configuration of the electronic device of FIG. 1. On the other hand.
Figure 2B:
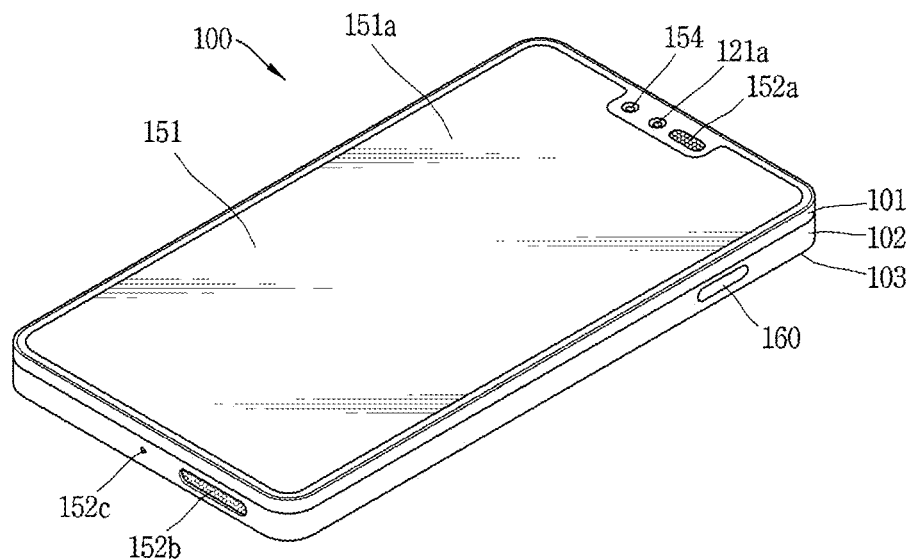
FIGS. 2B and 2C are conceptual views in which an example of an electronic device related to the present disclosure is seen from different directions.
Figure 2C:
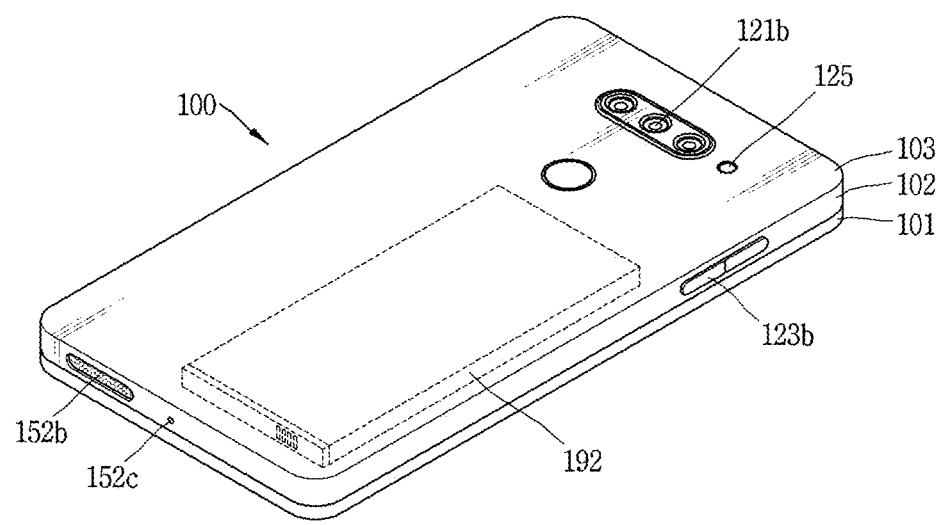

FIG. 1 shows a configuration for explaining an electronic device according to an embodiment and an interface between the electronic device and an external device or a server. On the other hand, referring to FIGS. 2A to 2C, FIG. 2A shows a detailed configuration of the electronic device of FIG. 1. On the other hand, FIGS. 2B and 2C are conceptual views in which an example of an electronic device related to the present disclosure is seen from different directions.

Referring to FIG. 1, an electronic device 100 may include a communication interface 110, an input interface (or an input device) 120, an output interface (or an output device) 150, and a processor 180. Here, the communication interface 110 may refer to a wireless communication module 110. Further, the electronic device 100 may further include a display 151 and a memory 170. FIG. 1 illustrates the electronic device having various components, but it may be understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for instance, a 4G communication network and a 5G communication network.

Referring to FIGS. 1 and 2A, the wireless communication module 110 may include at least one of a 4G wireless communication module 111, a 5G wireless communication module 112, a short-range communication module 113, a location information module 114 and the like. In this regard, the 4G wireless communication module 111, the 5G wireless communication module 112, the short-range communication module 113, and the location information module 114 may be implemented with a baseband processor such as a modem. For an example, the 4G wireless communication module 111, the 5G wireless communication module 112, the short-range communication module 113 and the location information module 114 may be implemented as a transceiver circuit and a baseband processor operating in an IF band. Meanwhile, an RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113 and the location information module 114 may be interpreted to include each RF module.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station. In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-standalone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a Sub6 frequency band, which is a range of 6 GHz or less, may be used as the 5G frequency band.

On the contrary, a millimeter wave (mmWave) band may be used as a 5G frequency band to perform wide band high-speed communication. When the mmWave band is used, the electronic device 100 may perform beamforming for communication coverage expansion with a base station.

Meanwhile, regardless of the 5G frequency band, in a 5G communication system, a larger number of multi-input multi-output (MIMO) may be supported to improve transmission speed. In this regard, Up-Link (UL) MIMO may be performed by a plurality of 5G transmission signals transmitted to a 5G base station. In addition, DL MIMO may be performed by a plurality of 5G reception signals received from the 5G base station.

Meanwhile, the wireless communication module 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is a module for acquiring a location (or current location) of an electronic device, and a representative example thereof includes a Global Positioning System (GPS) module or a Wireless Fidelity (WiFi) module. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. As the need arises, the location information module 114 may perform any function of the other modules of the wireless communication unit 110 to obtain data on the location of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Audio data or image data collected by the input device 120 may be analyzed and processed by a user's control command.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 may include at least one of a gesture sensor 340a, a gyro sensor 340b, a barometric pressure sensor 340c, a magnetic sensor 340d, an acceleration sensor 340e, a grip sensor 340f, a proximity sensor 340g, a color sensor 340h (e.g., RGB (red, green, blue) sensor), a biometric sensor 340i, a temperature/humidity sensor 340j, an illuminance sensor 340k, or a UV (ultra violet) sensor 340l, an optical sensor 340m, and a hall sensor 340n. In addition, the sensor module 140 may include at least one of a finger scan sensor, an ultrasonic sensor, an optical sensor (e.g., a camera (refer to 121)), a microphone (refer to 152c), a battery gauge, an environmental sensor (e.g., a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.). The electronic device disclosed herein may be configured to utilize information obtained from one or more sensors, and combinations thereof.

The output interface 150 is configured to generate an output related to visual, auditory or tactile sense, and may include at least one of a display 151, an audio module 152, a haptic module 153, and an indicator 154.

In this regard, the display 151 may have an inter-layered structure or integrally formed with a touch sensor to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, or a micro electro mechanical system (MEMS) display, or an electronic paper display. For example, the display 151 may display various types of content (e.g., text, an image, a video, an icon, and/or a symbol) to the user. The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using the interference of light. The projector 151c may project light onto a screen to display an image. The screen may be located inside or outside the electronic device 100, for example.

The audio module 152 may be configured to interwork with a receiver 152a, a speaker 152b, and a microphone 152c. Meanwhile, the haptic module 153 may convert an electrical signal into a mechanical vibration, and generate a vibration or a haptic effect (e.g., pressure, texture). The electronic device may include, for example, a mobile TV support device (e.g., GPU) capable of processing media data according to standards such as digital multimedia broadcasting (DMB), digital video broadcasting (DVB), MediaFlow or the like. Furthermore, the indicator 154 may display a specific state of the electronic device 100 or a part thereof (e.g., the processor 180), for example, a booting state, a message state, a charging state, or the like.

A wired communication module 160, which may be implemented as an interface unit, functions as a path to various types of external devices connected to the electronic device 100. The wired communication module 160 may include an HDMI 162, a USB 162, a connector/port 163, an optical interface 164, a D-sub (D-subminiature) 165, or the like. Furthermore, the wired communication module 160 may include at least one of wired or wireless headset ports, external power supply ports, wired or wireless data ports, memory card ports, ports for connecting a device having an identification module, audio input/output (I/O) ports, video input/output (I/O) ports, earphone ports, or the like. The electronic device 100 may perform appropriate control related to an external device connected thereto in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may interface with an electronic device through a base station. Meanwhile, a part of the second server 320 corresponding to the content server may be implemented as a mobile edge cloud (MEC) 330 in units of base stations. Accordingly, a distributed network may be implemented through the second server 320 implemented as the mobile edge cloud (MEC) 330 to shorten a content transmission delay.

The memory 170 may include a volatile and/or a non-volatile memory. Furthermore, the memory 170 may include an internal memory 170a and an external memory 170b. The memory 170 may store, for example, commands or data related to at least one other component of the electronic device 100. According to one embodiment, the memory 170 may store software and/or a program 240. For example, the program 240 may include a kernel 171, middleware 172, an application programming interface (API) 173, an application program (or "application") 174, or the like. At least a part of the kernel 171, the middleware 172, or the API 174 may be referred to as an operating system (OS).

The kernel 171 may control or mange system resources (e.g., a bus, the memory 170, the processor 180, etc.) used to execute operations or functions implemented in other programs (e.g., the middleware 172, the application programming interface (API) 173, or the application program 174). In addition, the kernel 171 may provide an interface capable of controlling or managing system resources by accessing individual components of the electronic device 100 from the middleware 172, the API 173, or the application program 174.

The middleware 172 may play an intermediary role such that the API 173 or the application program 174 communicates with the kernel 171 to send and receive data. Furthermore, the middleware 172 may process one or more work requests received from the application program 247 according to priority. In one embodiment, the middleware 172 may give a priority capable of using the system resource (e.g., the bus, the memory 170, the processor 180, etc.) of the electronic device 100 to at least one of the application programs 174 to process one or more work requests. The API 173, which is an interface for the application program 174 to control a function provided by the kernel 171 or the middleware 1723, may include, for instance, at least one interface or function (e.g., command) for file control, window control, image processing, text control, or the like.

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low-power processor (e.g., a sensor hub). For example, the processor 180 may execute an operation or data processing related to control and/or communication of at least one other component of the electronic device 100.

The power supply unit 190 may be configured to receive external power or provide internal power in order to supply appropriate power required for operating elements and components included in the electronic device 100, under the control of the processor 180. The power supply unit 190 includes a power management module 191 and a battery 192, and the battery 192 may be a built-in battery or a replaceable battery. The power management module 191 may include a power management integrated circuit (PMIC), a charger IC, or a battery or fuel gauge. The PMIC may have a wired and/or wireless charging method. The wireless charging method includes, for example, a magnetic resonance method, a magnetic induction method or an electromagnetic wave method, and may further include an additional circuit for wireless charging, for example, a coil loop, a resonance circuit, a rectifier, or the like. The battery gauge may measure, for example, the remaining amount, voltage, current, or temperature during charging of a battery 396. For example, battery 192 may include a rechargeable cell and/or a solar cell.

Each of an external device 100a, the first server 310, and the second server 320 may be the same or a different type of device (e.g., an external device or a server) as the electronic device 100. According to one embodiment, all or a part of operations executed in the electronic device 100 may be executed by one or more other electronic devices (e.g., the external device 100a, the first server 310, and the second server 320). According to one embodiment, when the electronic device 100 needs to perform a function or service automatically or upon request, the electronic device 100 may request at least some functions related thereto to other devices (e.g., the external device 100a, the first server 310, and the second server 320) instead of performing the function or service by itself. Other electronic devices (e.g., the external device 100a, the first server 310, and the second server 320) may execute a requested function or an additional function, and transmit the result to the electronic device 201. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a to control content or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Furthermore, the electronic device 100 may display content or control functions differently by controlling the electronic device 100 based on the authentication result. According to an embodiment of the present disclosure, the electronic device 100 may be connected to at least one external device 100a through a wired or wireless communication interface to receive or transmit information. For example, the electronic device 100 and the at least one external device 100a may receive and transmit information in a manner such as near field communication (NFC), a charger (e.g., universal serial bus (USB)-C)), an ear jack, BT (Bluetooth) or WiFi (wireless fidelity).

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Referring to FIGS. 2B and 2C, the electronic device 100 disclosed herein has a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

Referring to FIGS. 2A to 2C, the electronic device 100 may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content input by the touch method may be a text or numerical value, or a menu item capable of indication or designation in various modes.

In this manner, the display 151 may define a flexible touch screen along with the touch sensor, and in this case, the touch screen may function as the user input unit 123. Therefore, the touch screen may replace at least part of the functions of the first manipulation unit 123a.

The first audio output module 152a may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121a may process video frames such as still or moving images acquired by the image sensor in a video call mode or a capture mode. The processed video frames may be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be installed in the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 for supplying power to the electronic device 100. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It should be understood by those skilled in the art that the present disclosure can be embodied in other specific forms without departing from the concept and essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
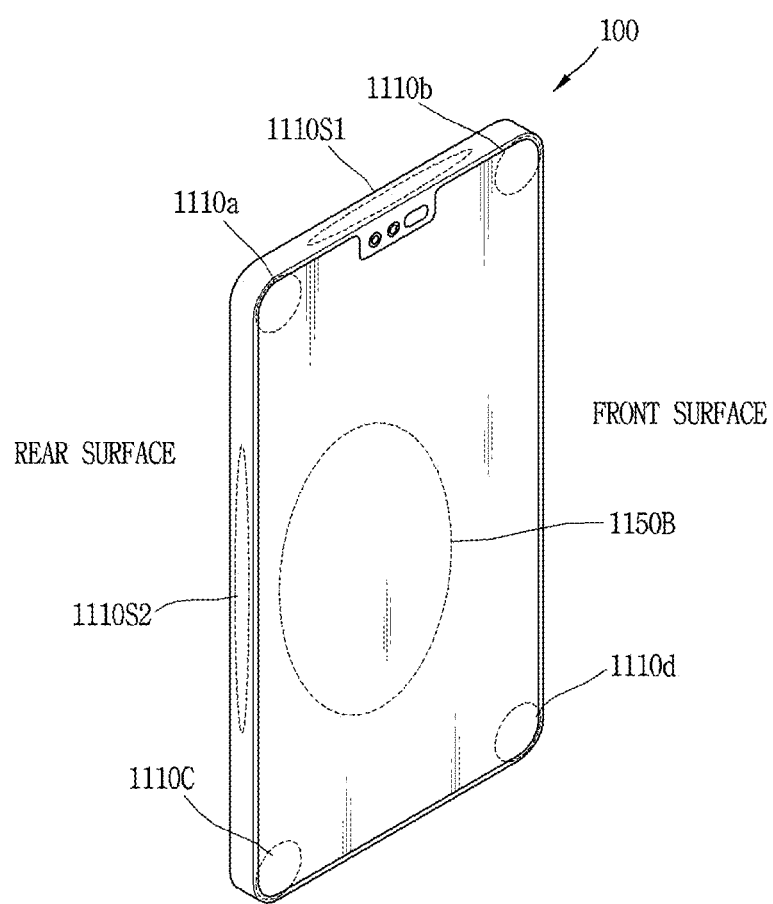
FIG. 3A shows an example of a configuration in which a plurality of antennas in an electronic device according to an embodiment can be disposed.

FIG. 3A shows an example of a configuration in which a plurality of antennas in an electronic device according to an embodiment can be disposed. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

Meanwhile, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with the base station through any one of the plurality of antennas 1110a to 1110d, 1150B, 1110S1 and 1110S2. Alternatively, the electronic device may perform multi-input multi-output (MIMO) communication with the base station through two or more antennas among the plurality of antennas 1110a to 1110d, 1150B, 1110S1 and 1110S2.

Figure 3B:
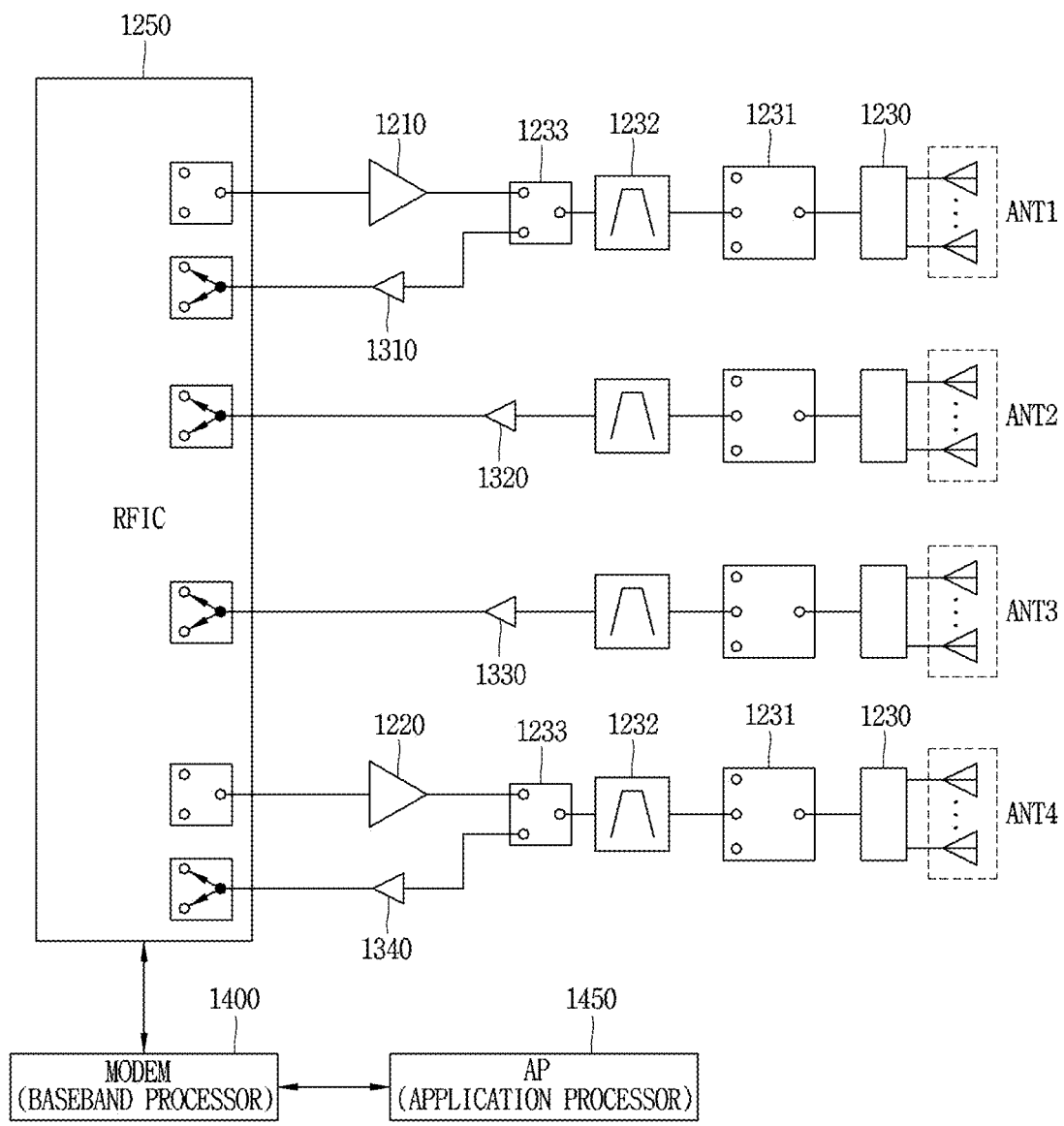
FIG. 3B illustrates a configuration of a wireless communication unit of an electronic device operable in a plurality of wireless communication systems according to an embodiment.

FIG. 3B illustrates a configuration of a wireless communication unit of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 1210, the second power amplifier 1220, the controller 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integration type, but is not limited thereto, and may also be configured as a 4G/5G separation type according to an application. When the RFIC 1250 is configured as a 4G/5G integrated type, it is advantageous in terms of synchronization between 4G/5G circuits, and also there is an advantage capable of simplifying control signaling by the modem 1400.

On the other hand, when the RFIC 1250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another implementation, when the remaining battery level of the electronic device is above a threshold value, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front-end parts can be controlled by an integrated transceiver, the front-end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 1250, and an additional component does not need to be disposed externally, thereby improving component mountability. In more detail, a single pole double throw (SPDT) type switch may be provided in the RFIC corresponding to the controller 1250 to select transmitters (TXs) of two different communication systems.

Also, the electronic device operable in the plurality of wireless communication systems according to an embodiment may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as array antennas ANT1 to ANT4 including a plurality of antenna elements. The phase controller 1230 is configurable to control the phase of a signal applied to each antenna element of each of the array antennas ANT1 to ANT4. In this regard, the phase controller 1230 may control both the magnitude and phase of a signal applied to each antenna element of each of the array antennas ANT1 to ANT4. Accordingly, since the phase controller 1230 controls both the magnitude and phase of the signal, it may also be referred to as a power and phase controller 230.

Therefore, the phase of a signal applied to each antenna element of each of the array antennas ANT1 to ANT4 may be controlled to perform beam-forming independently through each of the array antennas ANT1 to ANT4. In this regard, multi-input multi-output (MIMO) may be performed through each of the array antennas ANT1 to ANT4. In this case, the phase controller 230 may control the phase of a signal applied to each antenna element such that each of the array antennas ANT1 to ANT4 forms beams in different directions.

The duplexer 1231 is configured to separate signals in a transmission band and a reception band from each other. In this case, signals in a transmission band transmitted through the first and second power amplifiers 1210, 1220 are applied to the antennas (ANT1, ANT4) through a first output port of the duplexer 1231. On the contrary, a signal in a reception band received through the antennas (ANT1, ANT4) is received by the low noise amplifiers 310, 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an embodiment of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

Meanwhile, in another embodiment of the present disclosure, the switch 1233 may also be applicable to a frequency division duplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally divided into a single circuit.

The modem 1400 may perform control and signal processing for the transmission and reception of signals through different communication systems through the RFIC 1250. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at specific time and frequency resources. Accordingly, the RFIC 1250 may control transmission circuits including the first and second power amplifiers 1210, 1220 to transmit 4G or 5G signals in a specific time interval. In addition, the RFIC 1250 may control reception circuits including first through fourth low-noise amplifiers 1310 to 1340 to receive 4G or 5G signals in a specific time interval.

On the other hand, in the electronic device shown in FIGS. 1 to 2B, a specific configuration and function of the electronic device including an antenna disposed inside the electronic device as shown in FIG. 3A and a multi-transceiving system as shown in FIG. 3B will be described below.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Meanwhile, a 28 GHz band, a 38.5 GHz band, and a 64 GHz band are being considered as frequency bands to be allocated for 5G communication services in such a mmWave band. In this regard, a plurality of array antennas in the millimeter wave band may be disposed in the electronic device.

In this regard, an array antenna capable of operating in a millimeter wave (mmWave) band needs to operate in a wide band to cover one or more bands. In this regard, there is a problem in that it is difficult to design an antenna structure that operates in a wide band to cover a plurality of bands such as a 28 GHz band and a 38.5 GHz band with one antenna.

An aspect of the present disclosure is to solve the above-mentioned problems and other problems. Furthermore, another aspect of the present disclosure is to provide an electronic device including an antenna module in which an array antenna operating in a millimeter wave band is disposed and a configuration for controlling the same.

Still another aspect of the present disclosure is to provide an antenna structure that operates in a wide band to cover a plurality of bands in a millimeter wave band with one antenna.

Yet still another aspect of the present disclosure is to propose an antenna structure that operates as a notch filter in a band between a plurality of bands in a millimeter wave band.

Still yet another aspect of the present disclosure is to perform multi-input multi-output (MIMO) using an antenna structure that operates in a wide band to cover a plurality of bands in a millimeter wave band with one antenna.

Figure 4:
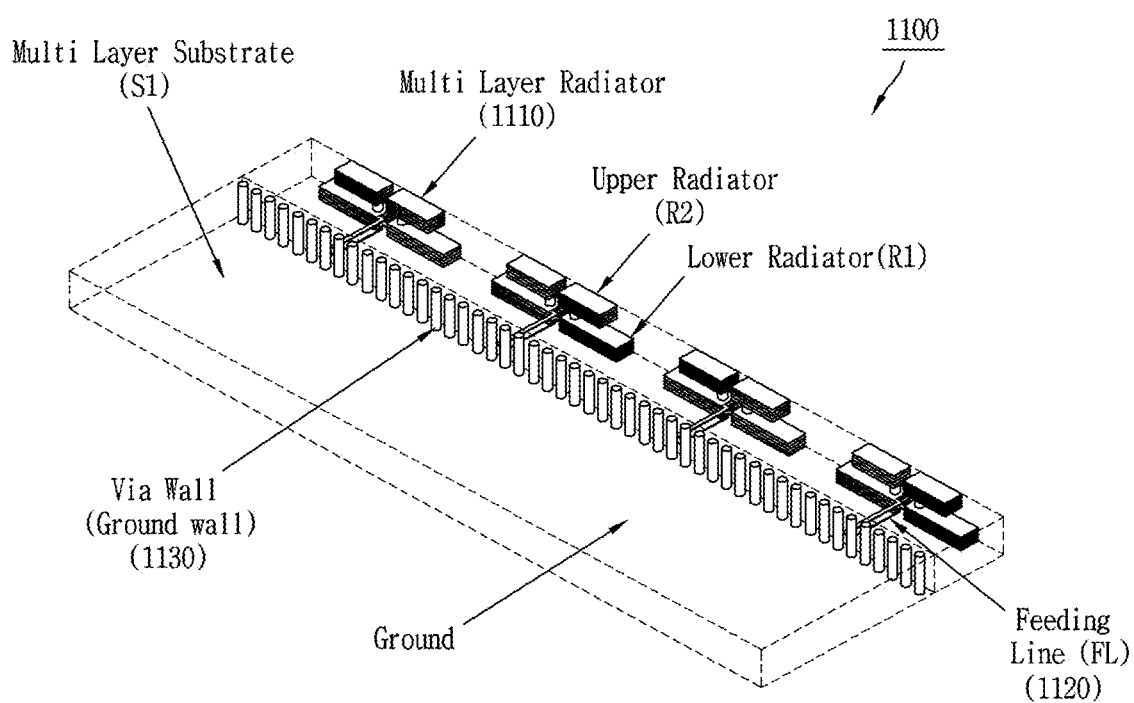
FIG. 4 is a perspective view of an antenna module in which a plurality of antennas are disposed according to an embodiment. On the other hand.
Figure 5:
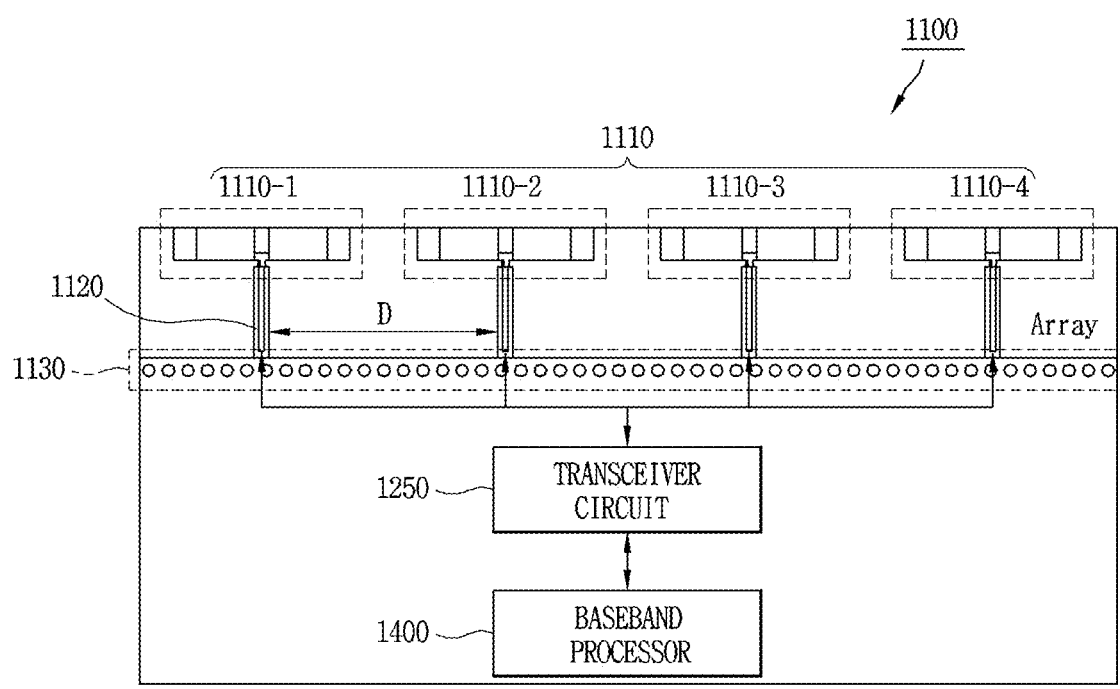
FIG. 5 shows a configuration for controlling an array antenna including a plurality of antennas in the antenna module of FIG. 4.

In this regard, FIG. 4 is a perspective view of an antenna module in which a plurality of antennas are disposed according to an embodiment. On the other hand, FIG. 5 shows a configuration for controlling an array antenna including a plurality of antennas in the antenna module of FIG. 4.

Meanwhile, the main solutions of the present disclosure for achieving the foregoing objective are as follows.

1) The lengths of the upper/lower radiators may be configured differently based on a core layer of an antenna module 1100.
2) The upper/lower radiators may be configured to generate a coupling between metal patterns facing each other on the upper/lower radiators using only one drill via for the core layer of the antenna module 1100. According to such a configuration of the radiator, it has a notch filter characteristic by a coupling in a frequency band of 31 to 35 GHz.
3) The upper short radiator operates as a main radiator in a mmWave high frequency band, and the lower long radiator operates in a low frequency band.
4) The feeding line (FL) may be connected to the lower long radiator to have dual resonance characteristics. In this case, when the feeding line (FL) is connected to the upper short radiator, the dual resonance characteristics may not be generated.

In this regard, the following effects may be achieved through the main solution of the present disclosure for achieving the foregoing objectives.

1) Since the antenna described herein operates in an ultra-wide band of 24 to 50 GHz, one antenna may cover an entire mmWave band.
2) Since a return loss S11 is improved from a level of −8 dB to a level of −10 dB or less, the antenna efficiency may be increased to increase a mmWave coverage.
3) Since the return loss S11 is improved from −8 dB to −10 dB or less, active devices such as a PA, an LNA, a switch, and a beam former in a mmWave system are less affected by the antenna return loss.
4) The antenna described herein does not operate as an antenna at 31 to 35 GHz and has a notch filter characteristic. Therefore, interference with other devices using 31 to 35 GHz does not occur.

On the other hand, referring to FIGS. 4 and 5, an electronic device may include an antenna module 1100, a transceiver circuit 1250, and a processor 1400. In this regard, the antenna module 1100 may include a plurality of antennas and a transceiver circuit 1250. Alternatively, the antenna module 1100 may include a plurality of antennas, a transceiver circuit 1250, and a baseband processor 1400.

At least one antenna 1110 may be disposed in the antenna module 1100. The antenna 1110 may be configured as an array antenna in which a plurality of antenna elements 1110-1 to 1110-4 are disposed to operate in a millimeter wave band. Meanwhile, a configuration of a single antenna element disposed in the antenna module 1100 will be described as follows.

In this regard, the antenna 1110 may include a first radiator R1 disposed below and a second radiator R2 disposed above. The first radiator R1 may be configured by stacking metal patterns having a predetermined width and length on different layers of a multi-layer substrate S1. The second radiator R2 may be configured by stacking metal patterns having a predetermined width and length above the first radiator R1.

The transceiver circuit 1250 may correspond to an RF front end and/or an RFIC. The transceiver circuit 1250 may be configured to be connected to any one metal pattern of the first radiator R1 and the second radiator R2 through a feeding line (FL) 1120. The transceiver circuit 1250 may apply a signal to the antenna 1110 through the feeding line (FL) 1120 to control the phase and/or magnitude of the applied signal.

Figure 6:
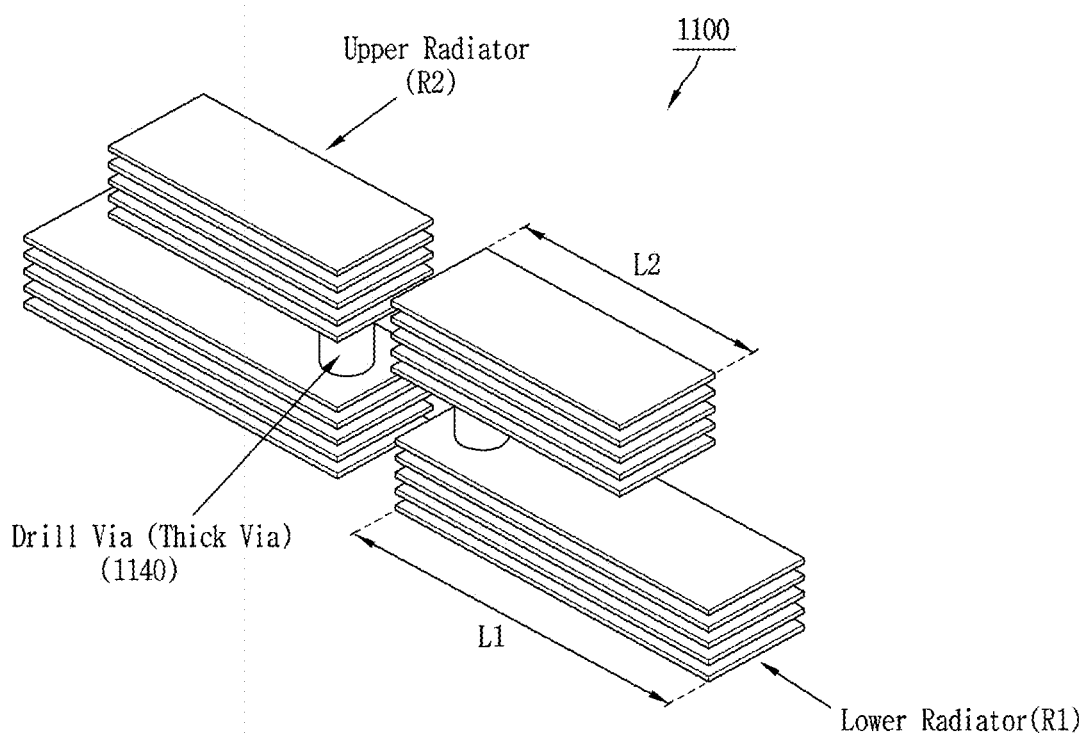
FIG. 6 shows a perspective view of an antenna element configured by stacking a plurality of metal patterns according to an example.
Figure 7A:
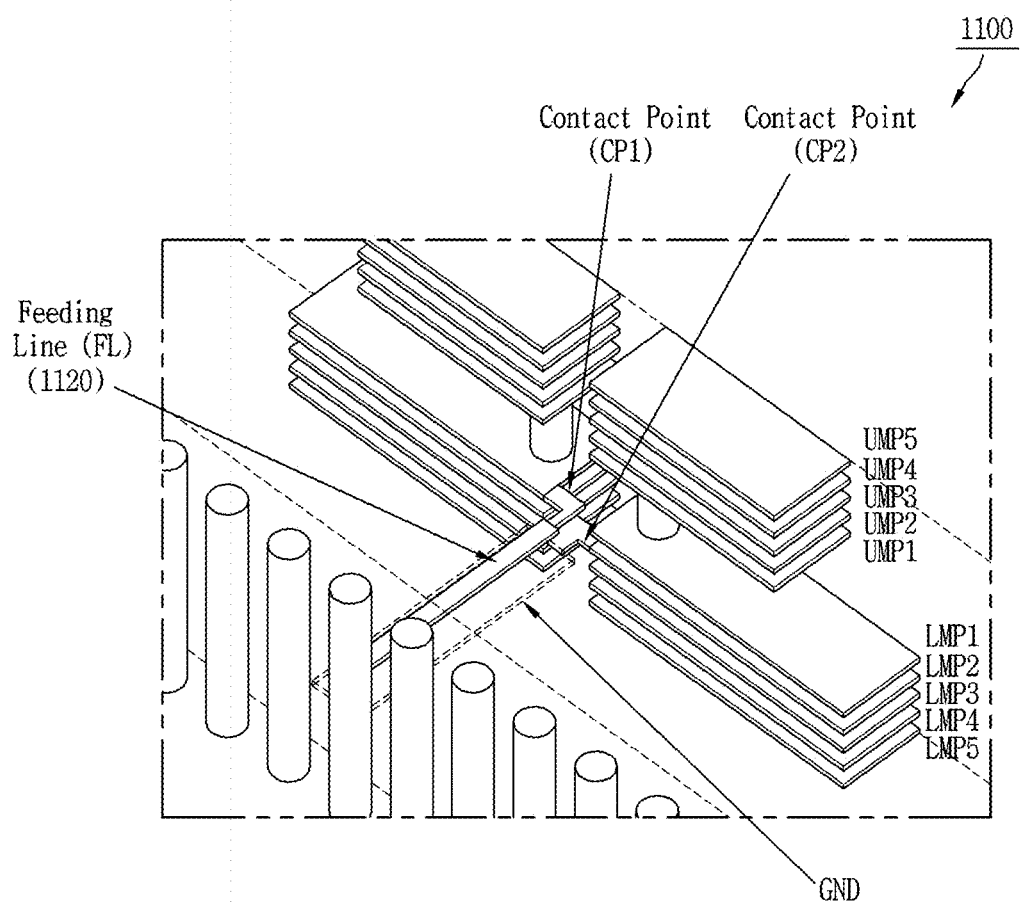
FIGS. 7A to 7C show a configuration in which the antenna element of FIG. 6 is connected to a feeding line and a ground.
Figure 7B:
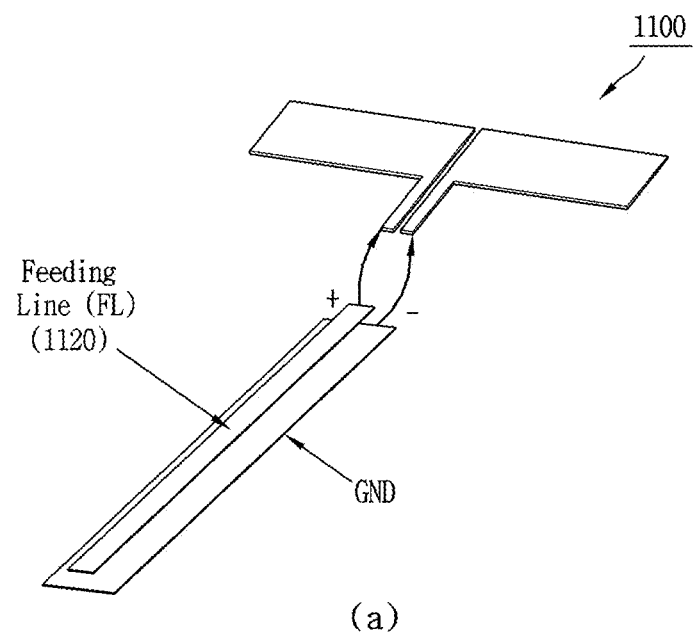
Figure 7B:
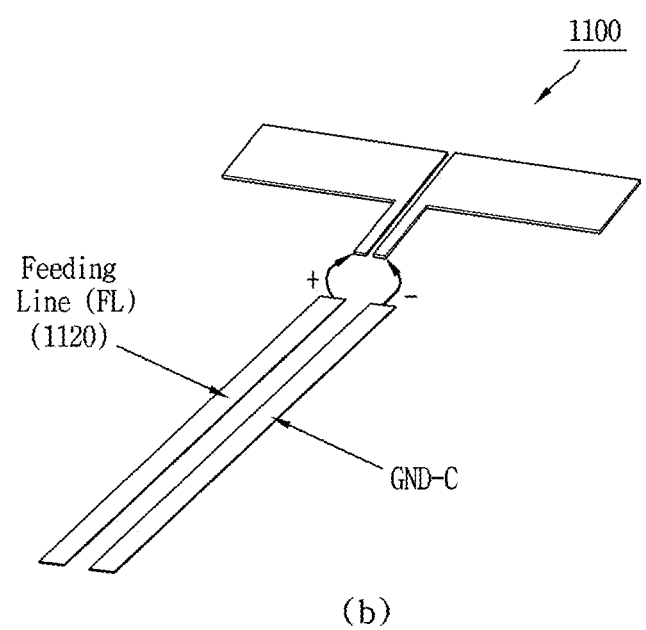
Figure 7C:
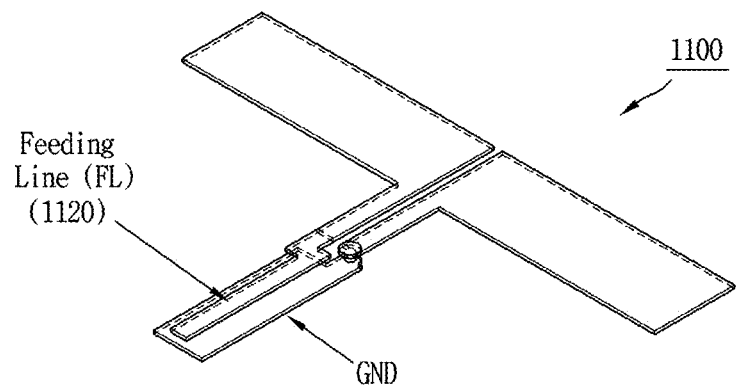
Figure 7C:
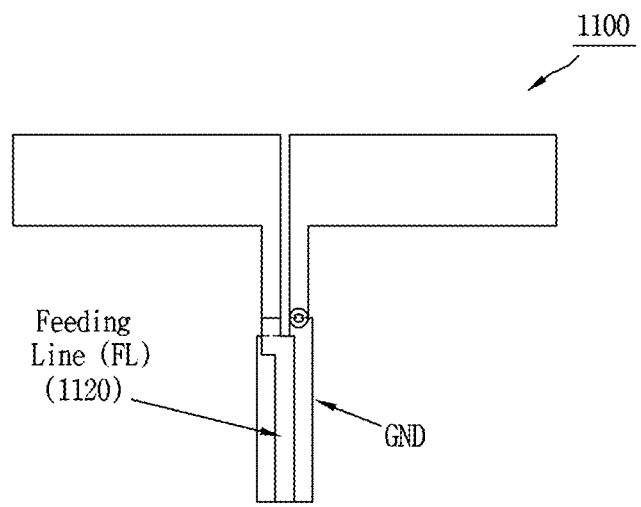
Figure 7C:
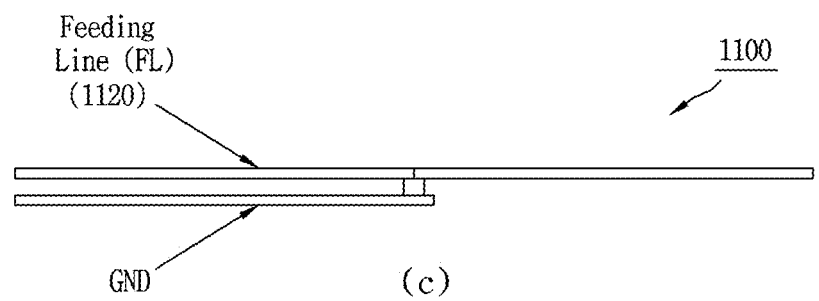

In order to describe the detailed configuration of each antenna element, reference is made to FIGS. 6 and 7C. In this regard, FIG. 6 shows a perspective view of an antenna element configured by stacking a plurality of metal patterns according to an example. FIGS. 7A to 7C show a configuration in which the antenna element of FIG. 6 is connected to a feeding line and a ground.

Referring to FIGS. 4 to 7C, an antenna operation related to the structural and electrical characteristics of the antenna element described herein is as follows.

1) A mmWave wideband notch antenna consists of a multi-layer substrate, an upper radiator, a lower radiator, a feeding line, a via wall (ground wall), and a ground.
2) In the present embodiment, four antennas are arranged, and may be disposed at regular intervals of 5 mm.
3) Placing the via wall on the substrate is to increase an antenna gain by acting as a reflector when a dipole antenna operates to radiate electromagnetic waves.
4) The radiator consists of a multi-layer, and the upper radiator has a length of 1.1 mm, and the lower radiator has a length of 1.65 mm with respect to a core layer.
5) The reason that the lengths of the upper radiator and the lower radiator are different is to allow the lower radiator and the upper radiator to operate at low mmWave frequencies (24~30 GHz) and high frequencies (35~50 GHz), respectively.
6) The upper/lower radiators are connected through vias (i.e., drill vias) that electrically connect the upper and lower surfaces of the core layer.
7) The drill vias do not connect the entire surfaces of the upper/lower radiators, but the vias are placed in the vicinity of left and right radiators adjacent to each other to allow the upper and lower radiators to operate at their own frequencies, respectively.

Referring to FIGS. 4 to 8B, the metal patterns of the first radiator R1 corresponding to the lower radiator may include metal patterns LMP1 to LMP5 spaced apart from each other by a predetermined distance for each layer. Here, the number of the metal patterns LMP1 to LMP5 of the first radiator R1 is not limited to five, and may be changed according to an application. As the number of the metal patterns LMP1 to LMP5 of the first radiator R1 increases, an antenna volume increases to improve bandwidth characteristics. However, as the number of the metal patterns LMP1 to LMP5 of the first radiator R1 increases, a height of the substrate increases to increase a height of the antenna module.

The metal patterns of the second radiator R2 corresponding to the upper radiator may include metal patterns UMP1 to UMP5 spaced apart from each other by a predetermined distance for each layer. Here, the number of the metal patterns UMP1 to UMP5 of the second radiator R2 is not limited to five, and may be changed according to an application. As the number of the metal patterns UMP1 to UMP5 of the first radiator R2 increases, an antenna volume increases to improve bandwidth characteristics. However, as the number of the metal patterns UMP1 to UMP5 of the first radiator R2 increases, a height of the substrate increases to increase a height of the antenna module.

A metal pattern LMP1 disposed at an upper portion of the first radiator R1 and a metal pattern UMP1 disposed at a lower portion of the second radiator R2 may be interconnected by a vertical via 1140. Here, since the vertical via 1140 has a larger diameter than the other vias, it may be formed by drilling, and may be referred to as a drill via.

Referring to FIG. 7B(a), the feeding line (FL) 1120 and the ground (GND) may be disposed on different planes. Referring to FIG. 7B(b), the feeding line (FL) 1120 and the ground (GND-C) may be disposed on the same plane. Here, since the ground (GND-C) is disposed on the same plane as the feeding line (FL) 1120, it may be referred to as a co-planar waveguide structure.

In relation to a feeding method of FIG. 7B, the phase of a signal transmitted through the feeding line (FL) 1120 and the ground (GND) may have a difference of substantially 180 degrees. FIG. 7B(a) shows a configuration in which the feeding line (FL) 1120 and the ground (GND) are connected to the radiator when (+) and (−) lines are on different layers in a multi-layer substrate. FIG. 7B(b) shows a configuration in which the feeding line (FL) 1120 and the ground (GND) are connected to the radiator when the (+) and (−) lines are on the same layer in the multi-layer substrate.

In this regard, the feeding line (FL) 1120 and the ground (GND) may be disposed in parallel with the (+) line and the (−) line. The feeding line (FL) 1120 and the ground (GND, GND-C) may be configured to be connected to each radiator.

Referring to FIG. 7C, the feeding line (FL) 1120 and the ground (GND) may be disposed on different planes. In this regard, FIG. 7C(a) is a perspective view of a structure in which the feeding line (FL) 1120 and the ground (GND) disposed on different side surfaces are connected to the radiator. FIG. 7C(b) shows a front view of a structure in which the feeding line (FL) 1120 and the ground (GND) disposed on different side surfaces are connected to the radiator. FIG. 7C(c) is a side view of a structure in which the feeding line (FL) 1120 and the ground (GND) disposed on different side surfaces are connected to the radiator.

Referring to FIG. 7C, the feeding line (FL) 1120 is a transmission line configured to have a characteristic impedance of 50 ohms, and may be disposed on a layer different from the ground (GND). A relative potential difference is generated between two conductors including the feeding line (FL) 1120 and the ground (GND). The feeding line (FL) 1120 corresponding to the (+) line and the ground (GND) corresponding to the (−) line are connected to each radiator. In this regard, referring to FIGS. 7C and 8A, the feeding line (FL) 1120 may be connected to the first metal pattern LMP1 disposed at an upper portion of the first radiator R1. On the contrary, the ground (GND) may be connected to the second metal pattern LMP2 disposed below the first metal pattern LMP1.

For another example, the feeding line (FL) 1120 and the ground (GND) may be connected to a metal pattern disposed on the same layer. In this regard, the feeding line (FL) 1120 and the ground (GND) may be connected to the first metal pattern LMP1 disposed at an upper portion of the first radiator R1. In this case, the ground (GND) may be connected to an upper layer through a via and connected to a right radiator corresponding to the first metal pattern LMP1. The feeding line (FL) 1120 may be connected to a left radiator in a straight line or may be connected to the left radiator in a straight line again in a state of being bent at a right angle by a predetermined length. Accordingly, a spacing between the left and right radiators or the like may be adjusted while maintaining a symmetric feeding structure in which the ground (GND) of the feeding line (FL) 1120 and the center line are matched.

Figure 8A:
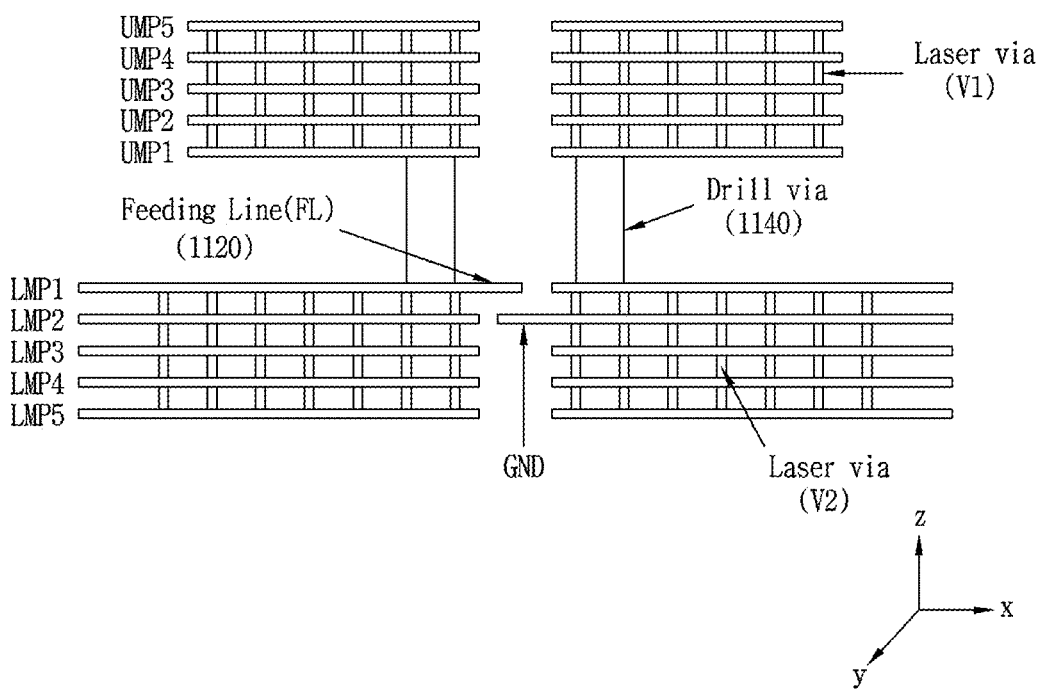
FIG. 8A shows an antenna structure in which metal patterns disposed on different layers of a radiator are interconnected, according to an embodiment.
Figure 8B:
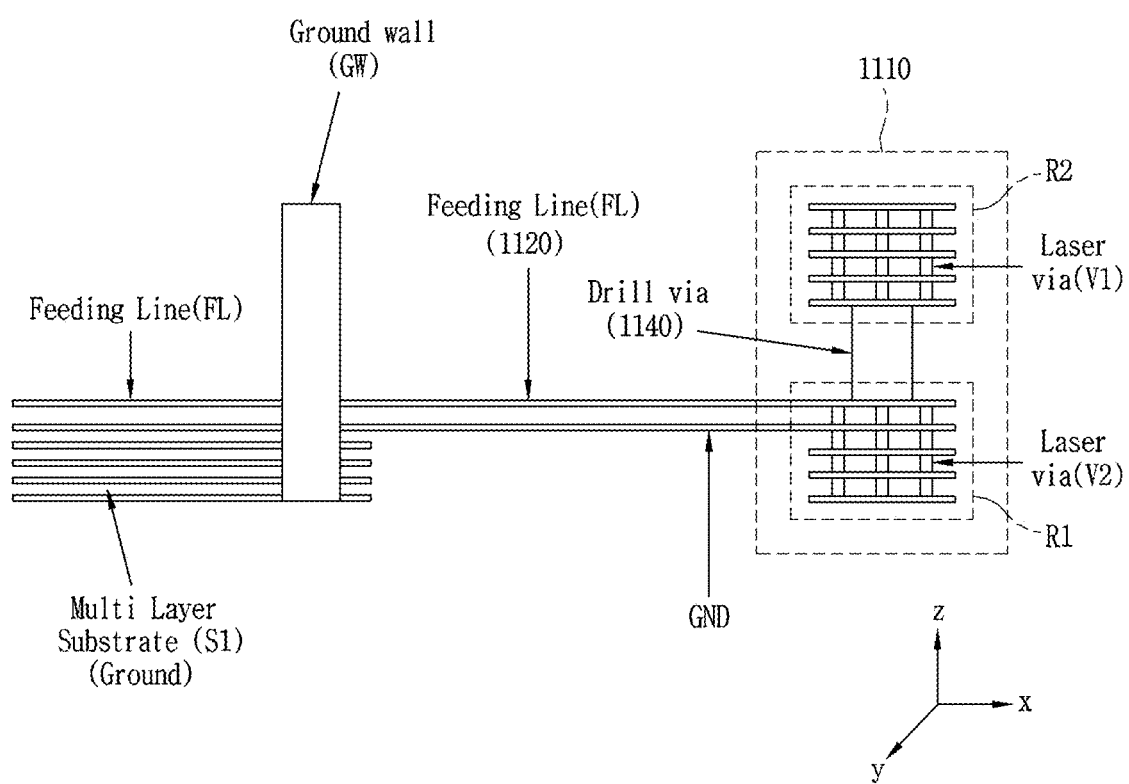
FIG. 8B shows a side view of an antenna of FIG. 8A and a substrate on which the antenna is implemented.

The metal patterns of the first radiator R1 may be configured to be interconnected. The metal patterns of the second radiator R2 may also be configured to be interconnected. In this regard, FIG. 8A shows an antenna structure in which metal patterns disposed on different layers of a radiator are interconnected according to an embodiment. FIG. 8B shows a side view of an antenna of FIG. 8A and a substrate on which the antenna is implemented.

Referring to FIGS. 4 to 8B, a configuration in which the feeding line and the ground of the antenna element described herein are connected and electrical characteristics thereof are as follows.

1) A characteristic impedance of the feeding line (FL) is 50 ohms, and it is disposed on a different layer from a ground (GND) line.
2) The ground (GND) line extends from a multi-layer ground disposed on a substrate, and is connected to the radiator.
3) A ratio of widths of the feeding line (FL) and the ground (GND) line may be set to a predetermined ratio. For an example, a ratio of the widths of the feeding line (FL) and the ground (GND) line may be 1:3. In this regard, the width of the ground (GND) line at a portion connected to the radiator may be reduced to ½. However, since the width of the feeding line (FL) is also reduced to ½, a ratio of the widths of the feeding line (FL) to the ground (GND) line is maintained at 1:3. This is to maintain the characteristic impedance of the feeding line (FL) at 50 ohms.
4) A point at which the feeding line (FL) and the ground (GND) line are in contact with the radiator is a lower radiator with a long radiator. A point at which the feeding line (FL) is in contact with the radiator may be an uppermost metal pattern of the lower radiator. Meanwhile, a point at which the ground (GND) line is in contact with the radiator may be a metal pattern immediately adjacent to the uppermost metal pattern.

Referring to FIGS. 4 to 8B, the metal patterns LMP1 to LMP5 of adjacent layers of the first radiator R1 may be interconnected by first vertical vias V1 spaced apart from each other by a predetermined distance. The metal patterns UMP1 to UMP5 of adjacent layers of the second radiator R2 may be interconnected by second vertical vias V2 spaced apart from each other by a predetermined distance.

In this regard, the vertical vias connecting the metal patterns of adjacent layers in the first radiator R1 and the second radiator R2 may be implemented as vias in a one-dimensional shape spaced apart from each other by a predetermined distance in one axial direction. Alternatively, the vertical vias connecting the metal patterns of adjacent layers in the first radiator R1 and the second radiator R2 are implemented as vias in a two-dimensional shape spaced apart from each other by a predetermined distance in one axial direction and the other axial direction perpendicular thereto.

The first vertical vias V1 may be configured to connect the metal patterns of adjacent layers in one axial direction. The second vertical vias V2 may be configured to connect the metal patterns of adjacent layers in one axial direction. Accordingly, the first vertical vias V1 and the second vertical vias V2 connecting the metal patterns of adjacent layers may be implemented as vias in a one-dimensional shape spaced apart from each other by a predetermined distance in one axial direction. In this regard, referring to FIG. 8A, the first vertical vias V1 and the second vertical vias V2 may be implemented as a plurality of vias spaced apart from each other by a predetermined distance in an x-axis direction. Furthermore, the first vertical vias V1 and the second vertical vias V2 may be implemented on a z-axis so that adjacent metal patterns are connected to each other.

The first vertical vias V1 may be configured to connect the metal patterns of adjacent layers in one axial direction and the other axial direction perpendicular to the one axial direction. The second vertical vias V2 may be configured to connect the metal patterns of adjacent layers in one axial direction and the other axial direction perpendicular to the one axial direction. Accordingly, the first vertical vias V1 and the second vertical vias V2 connecting the metal patterns of adjacent layers may be implemented as vias in a two-dimensional shape spaced apart from each other by a predetermined distance in one axial direction and the other axial direction perpendicular to the one axial direction. In this regard, referring to FIG. 8B, the first vertical vias V1 and the second vertical vias V2 may be implemented as a plurality of vias spaced apart from each other by a predetermined distance in an x-axis direction and a plurality of vias spaced apart from each other by a predetermined distance in a y-direction. Furthermore, the first vertical vias V1 and the second vertical vias V2 may be implemented on a z-axis so that adjacent metal patterns are connected to each other.

The feeding line (FL) 1120 and the ground (GND) line may be respectively connected to metal patterns disposed in different layers. In this regard, the feeding line (FL) 1120 may be connected to one of the first metal patterns LMP1 disposed on the uppermost layer of the first radiator R1. The ground (GND) line may be connected to any one of the second metal patterns LMP2 disposed under the first metal patterns LMP1. Accordingly, the ground (GND) may be disposed on a lower layer immediately adjacent to the feeding line (FL) 1120 to reduce a feeding loss. That is, the feeding line (FL) 1120 guided by the ground (GND) to the lower layer immediately adjacent thereto may reduce a feeding loss compared to a case where the ground is disposed only under the multi-layer substrate S1.

More specifically, an end portion of the feeding line (FL) 1120 may be connected to the first metal pattern LMP1 disposed at one side of the first metal patterns. An end of the ground (GND) line may be connected to a second metal pattern LMP2 disposed at the other side of the second metal patterns. In this regard, the first metal patterns LMP1 and the feeding line (FL) 1120 may be disposed on a first layer that is the uppermost layer of the multi-layer circuit substrate S1. Meanwhile, the ground (GND) line corresponding to the feeding line (FL) 1120 may be disposed on a second layer that is adjacent to the uppermost layer of the multi-layer circuit substrate S1.

The antenna module 1000 may further include a ground wall (GW) configured to connect the multi-layer circuit substrate S1 and disposed to be spaced apart from the first radiator R1 by a predetermined distance. A height of the ground wall (GW) may be disposed to be higher than that of the multi-layer circuit substrate S1.

The metal patterns in the first radiator R1 and the second radiator R2 may have different lengths. According to an embodiment, the lengths of the metal patterns LMP1 to LMP5 disposed on each layer of the first radiator R1 may be disposed to have a first length L1. The metal patterns disposed on each layer of the second radiator R2 may be disposed to have a second length L2 that is shorter than the first length L1.

In this regard, the metal patterns LMP1 to LMP5 disposed on each layer of the first radiator R1 may be all disposed to have the first length L1 that is the same length. Meanwhile, the metal patterns disposed on each layer of the second radiator R2 may be all disposed to have the second length L2 that is the same length.

Figure 9A:
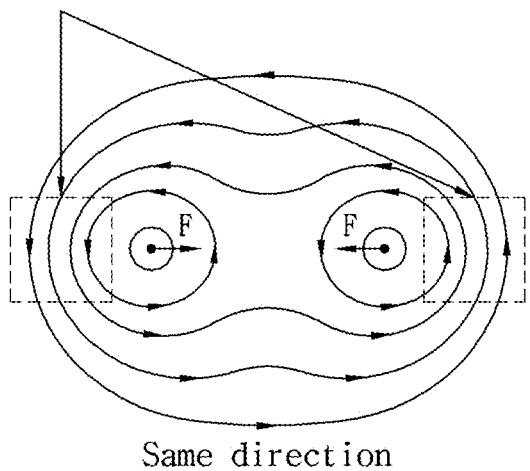
FIG. 9A is a conceptual view showing characteristics of an electric field formed according to current directions between two conductors.
Figure 9A:
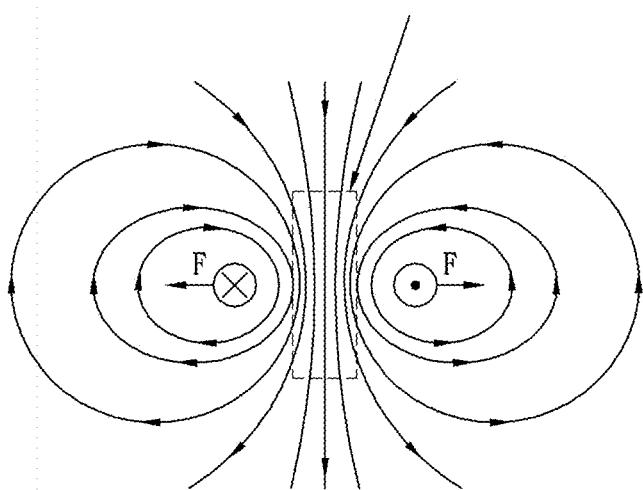
Figure 9B:
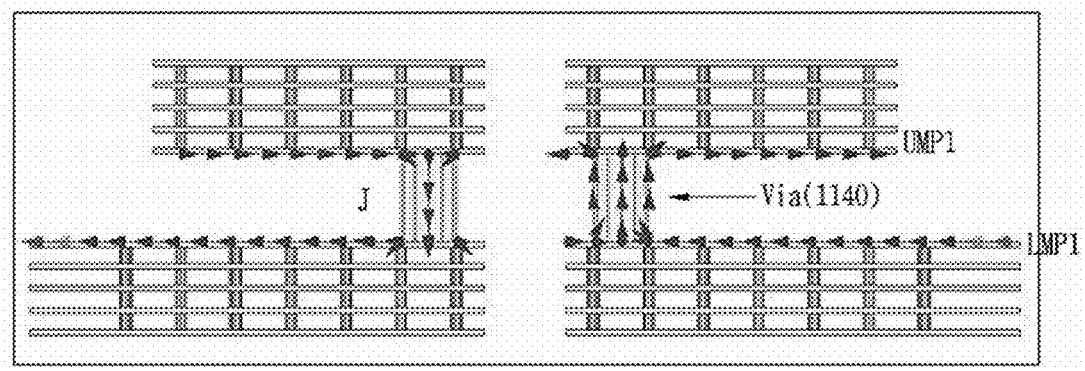
FIG. 9B is a side view of an antenna structure in which a current direction according to an example is indicated. On the other hand.

The antenna 1100 described herein may be configured to operate in different bands among millimeter wave bands. In this regard, FIG. 9A shows a current distribution diagram when an antenna according to an embodiment operates in a first band. On the other hand, FIG. 9B shows a current distribution diagram when the antenna of FIG. 9A operates in a second band higher than the first band.

Referring to FIGS. 4 to 9B, the antenna element 1100 including the first radiator and the second radiator may be configured to operate in a first band and a second band higher than the first band. Here, the first band and the second band may be a 28 GHz band and a 39 GHz band, respectively, but are not limited thereto and may be changed according to an application.

The current direction and electric field characteristics in the antenna structure described herein will be described as follows. FIG. 9A is a conceptual view showing characteristics of an electric field formed according to current directions between two conductors. FIG. 9B is a side view of an antenna structure in which a current direction according to an example is indicated. On the other hand, FIG. 9C is a perspective view of an antenna structure in which a current direction according to an example is indicated.

Referring to FIG. 9A(a), when two conductors having the same current direction are disposed, an electric field (E-field) is radiated to the outside. On the contrary, referring to FIG. 9A(b), when two conductors having different current directions are close to each other, the electric field (E-field) is bounded inside and cannot be radiated to the outside. Therefore, when the directions of currents generated on surfaces facing each other on the upper/lower radiators are opposite to each other and have strong current intensities, the electric field cannot be radiated at a specific frequency. Using this principle, the antenna described herein can operate as a notch filter rather than a radiator in a specific frequency band, for instance, a 30-35 GHz band.

Figure 9C:
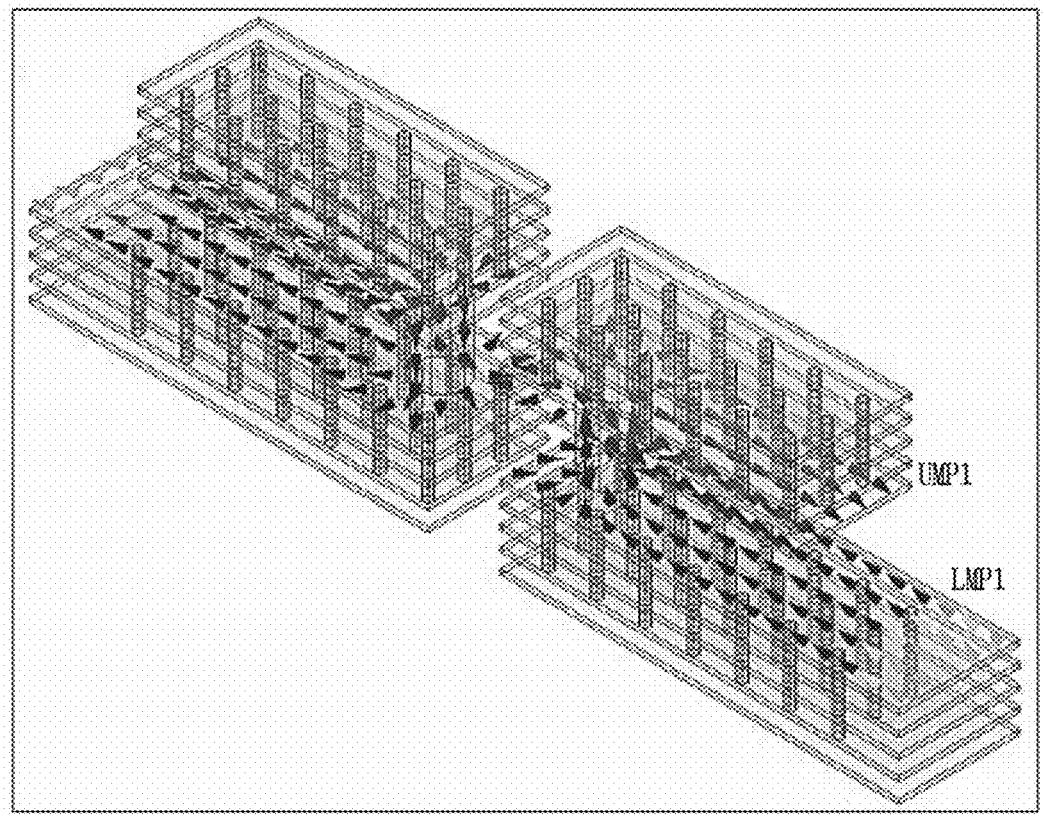
FIG. 9C is a perspective view of an antenna structure in which a current direction according to an example is indicated.

In this regard, FIGS. 9B and 9C are views showing current distribution diagrams of two conductor surfaces facing each other on upper/lower radiators in a specific frequency band, for example, 30 to 35 GHz. A signal transmitted from the feeding line (FL) 1120 is transmitted to the lower radiator LMP1 and is transmitted to the upper radiator UMP1 through the via 1140. Accordingly, strong currents are generated at the same time in the upper and lower radiators to cause a phenomenon in which the E-field is trapped inside the radiator. That is, it can be seen that a current distribution J in opposite directions is formed between the lower radiator LMP1 and the upper radiator UMP1. Accordingly, the antenna presented herein exhibits notch filter characteristics in that radio waves are unable to radiate in the 30-35 GHz band.

Figure 10A:
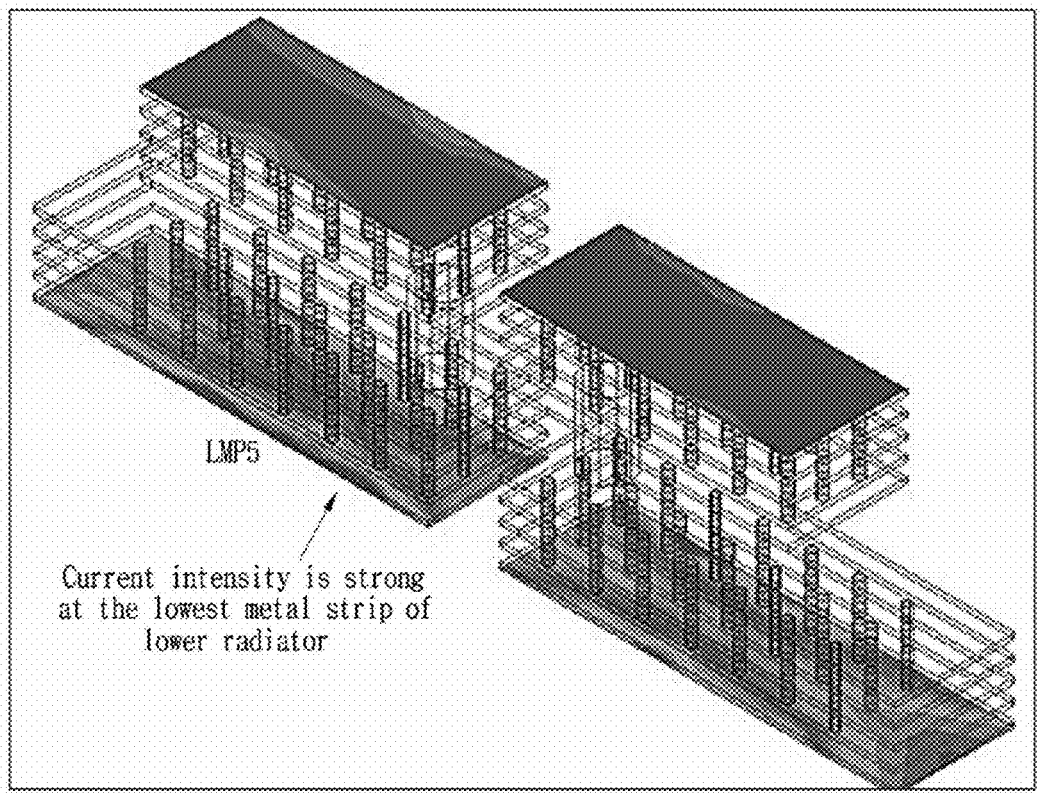
FIG. 10A shows a current distribution diagram when an antenna according to an embodiment operates in a first band. On the other hand.

Referring to FIGS. 4 to 8B and 10A, when the antenna element 1100 described herein operates for each band, the characteristics of a current distribution diagram induced in a metal pattern of the antenna element 1100 are as follows. In this regard, FIG. 10A shows a current distribution diagram when an antenna according to an embodiment operates in a first band. On the other hand, FIG. 10B shows a current distribution diagram when the antenna of FIG. 10A operates in a second band higher than the first band.

Figure 10B:
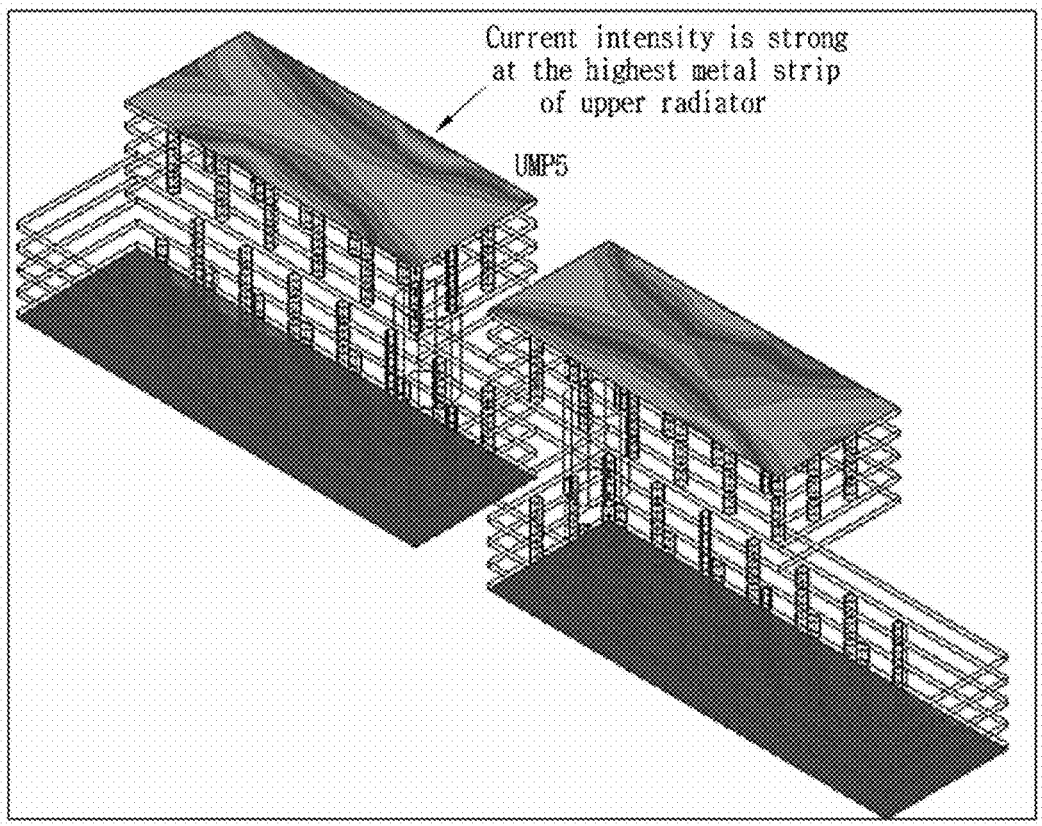
FIG. 10B shows a current distribution diagram when the antenna of FIG. 10A operates in a second band higher than the first band.

1) Referring to the current distribution diagram of FIG. 10A, a current intensity of the lower radiator is stronger than that of the upper radiator at 28 GHz.
2) Referring to the current distribution diagram of FIG. 10B, a current intensity of the upper radiator is stronger than that of the lower radiator at 39 GHz.
3) Therefore, the top/bottom radiators operate as main radiators in high/low frequency bands, respectively. Accordingly, the high frequency operating band can be tuned by changing a length of the upper radiator. In addition, the low frequency operating band can be tuned by changing a length of the lower radiator.

In the first band, a current intensity formed in the metal patterns of the first radiator R1 that is the lower radiator is distributed to be higher than that formed in the metal patterns of the second radiator R2 that is the upper radiator. More specifically, a current intensity of the lowermost metal pattern LMP5 in the first radiator R1 is the strongest at 28 GHz belonging to the first band.

Referring to FIGS. 4 to 8B and 10B, in the second band, the current intensity formed in the metal patterns of the second radiator R2 is distributed to be higher than that formed in the metal patterns of the first radiator R1. More specifically, a current intensity of the uppermost metal pattern UMP5 in the second radiator R2 is the strongest at 39 GHz belonging to the second band.

On the other hand, referring to FIGS. 4 and 5, the antenna element 1100 including the first radiator and the second radiator may constitute an array antenna. In this regard, referring to FIGS. 4 to 8B, the antenna 1110 may be configured as an array antenna (array) in which a plurality of antenna elements 1110-1 to 1110-4 are arranged to operate in a millimeter wave band. The antenna element 1110 including the first radiator R1 and the second radiator R2 may constitute an array antenna in which a plurality of antenna elements 1110-1 to 1110-4 are disposed to be spaced apart from each other by a predetermined distance. In this regard, the number of antenna elements included in the array antenna (array) is not limited to four and may be changed according to an application.

The electronic device may include an antenna module 1100, a transceiver circuit 1250, and a processor 1400. The antenna module 1100 may include a plurality of antennas and a transceiver circuit 1250. Alternatively, the antenna module 1100 may include a plurality of antennas, a transceiver circuit 1250, and a baseband processor 1400.

The transceiver circuit 1250 may correspond to an RF front end and/or an RFIC. The transceiver circuit 1250 may be configured to be connected to any one metal pattern of the first radiator R1 and the second radiator R2 through the feeding line FL 1120. The transceiver circuit 1250 may apply a signal to the plurality of antenna elements 1110-1 to 1110-4 through the feeding line (FL) 1120 and control the phase and/or magnitude of the applied signal.

In this regard, the transceiver circuit 1250 may perform beamforming by varying the phase of a signal applied to the plurality of antenna elements 1110-1 to 1110-4 through a phase shifter. In addition, the transceiver circuit 1250 may control the output power by varying the magnitude of the signal applied to the plurality of antenna elements 1110-1 to 1110-4 through a variable amplifier or a variable attenuator.

The baseband processor 1400 may be configured to be operatively coupled to the transceiver circuit 1250 to control the transceiver circuit 1250. In this regard, the baseband processor 1400 may be configured to control the phase of a signal applied to each of the antenna elements 1110-1 to 1110-4 of the array antenna (array) through the transceiver circuit 1250.

In the above, an electronic device having an antenna operating in a millimeter wave band according to an aspect of the present disclosure has been described. Hereinafter, an antenna module operating in a millimeter wave band according to another aspect of the present disclosure will be described. In this regard, referring to FIGS. 4 to 9C, the antenna module 1100 may include a lower radiator R1 and an upper radiator R2. In this case, both the lower radiator R1 and the upper radiator R2 may be referred to as an antenna element 1110. Meanwhile, the antenna module 1100 may include the lower radiator R1, the upper radiator R2, and the feeding line (FL) 1120.

The lower radiator R1 may be configured by stacking metal patterns having a predetermined width and length on different layers of a multi-layer substrate S1. The upper radiator R2 may be configured by stacking metal patterns having a predetermined width and length above the first radiator R1.

The feeding line (FL) 1120 may be disposed on any one layer of the multi-layer circuit substrate S1. The feeding line (FL) 1120 may be configured to be connected to a metal pattern disposed on any one layer of the lower radiator R1.

The metal patterns of the lower radiator R1 may include metal patterns LMP1 to LMP5 spaced apart from each other by a predetermined distance for each layer. The number of metal patterns of the lower radiator R1 is not limited thereto and may be changed according to an application. As the number of metal patterns of the lower radiator R1 increases, it is advantageous in terms of antenna characteristics such as an antenna bandwidth. However, as the number of metal patterns of the lower radiator R1 increases, a total antenna height increases.

The metal patterns of the upper radiator R2 may include metal patterns UMP1 to UMP5 spaced apart from each other by a predetermined distance for each layer. The number of metal patterns of the upper radiator R2 is not limited thereto and may be changed according to an application. As the number of metal patterns of the upper radiator R2 increases, it is advantageous in terms of antenna characteristics such as an antenna bandwidth. However, as the number of metal patterns of the upper radiator R2 increases, a total antenna height increases.

The metal pattern LMP1 disposed on the uppermost layer of the lower radiator R1 and the metal pattern UMP1 disposed on the lowermost layer of the upper radiator R2 may be interconnected by a vertical via 1140.

The metal patterns LMP1 to LMP5 of adjacent layers of the lower radiator R1 may be interconnected by first vertical vias V1 spaced apart from each other by a predetermined distance. The metal patterns UMP1 to UMP5 of adjacent layers of the upper radiator R2 may be interconnected by second vertical vias V2 spaced apart from each other by a predetermined distance.

The feeding line (FL) 1120 may be connected to one of the first metal patterns LMP1 disposed on the uppermost layer of the first radiator R1. The ground (GND) line may be connected to any one of the second metal patterns LMP2 disposed under the first metal patterns LMP1.

An end portion of the feeding line (FL) 1120 may be connected to the first metal pattern disposed at one side of the first metal patterns LMP1. An end of the ground (GND) line may be connected to a second metal disposed pattern at the other side of the second metal patterns LMP2.

Figure 10C:
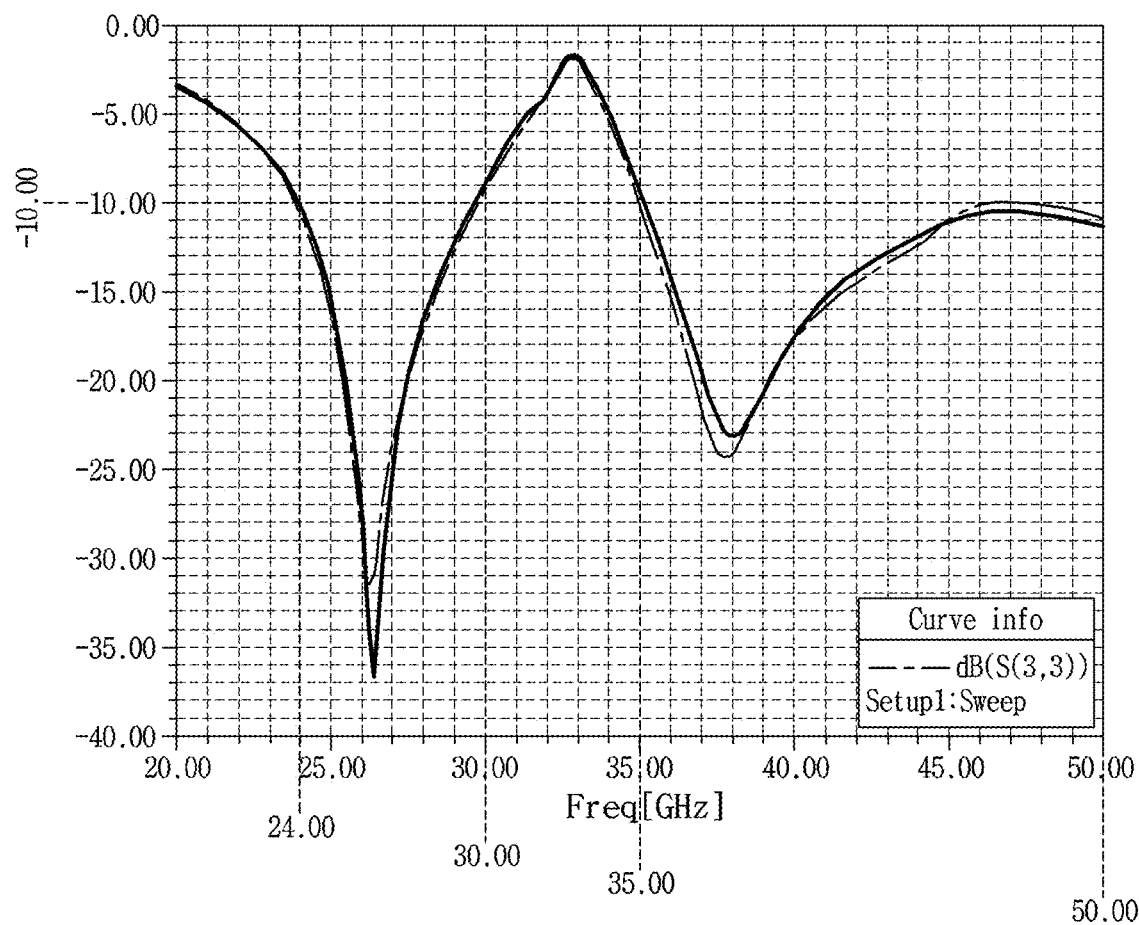
FIG. 10C shows a reflection coefficient of an antenna element having a stacked structure described herein.
Figure 10D:
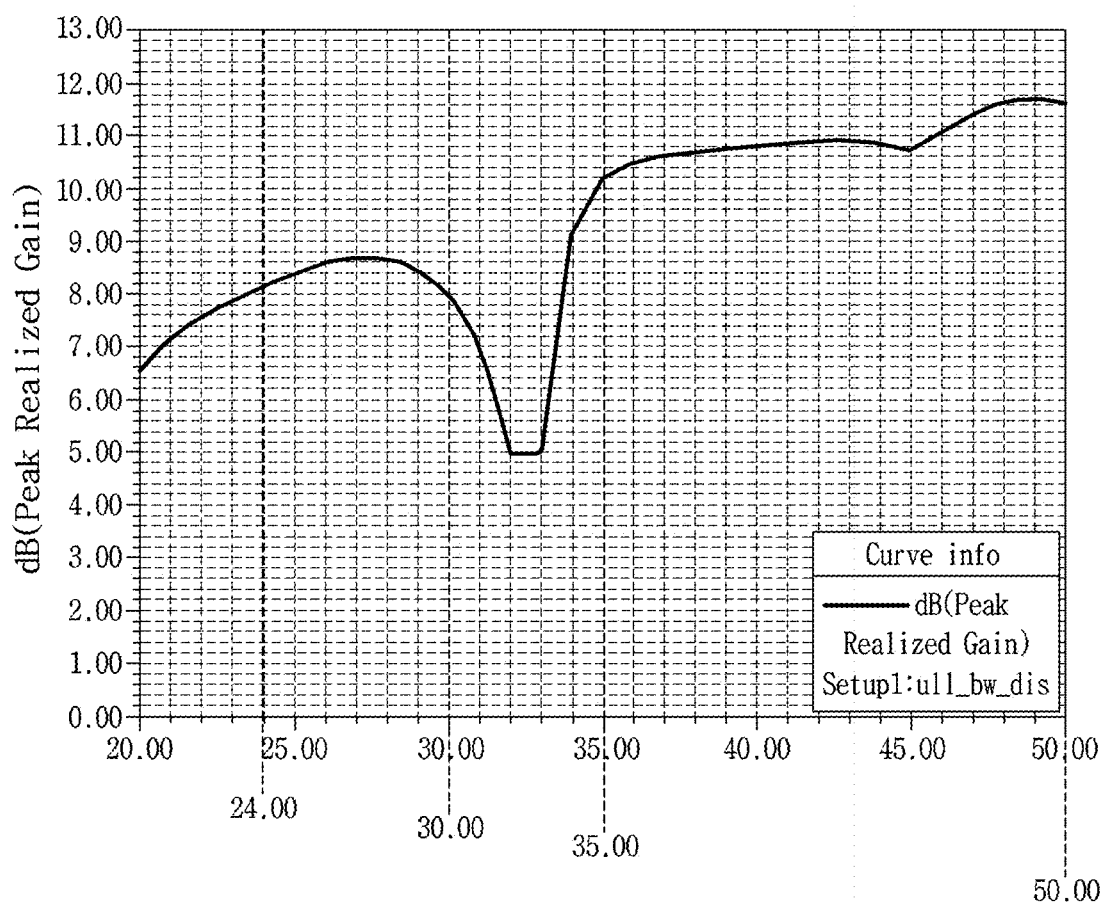
FIG. 10D shows gain characteristics of the antenna element of FIG. 10C.

With regard to the foregoing antenna module 1100, the electrical characteristics of the single antenna element 1110 will be described as follows. In this regard, FIG. 10C shows a reflection coefficient of an antenna element having a stacked structure described herein. FIG. 10D shows gain characteristics of the antenna element of FIG. 10C.

Referring to FIGS. 4 to 9C and 10C, a return loss characteristic of the antenna element 1100 satisfies a criterion of S11<−10 dB in frequency bands of 24 to 30 GHz and 35 to 50 GHz. Meanwhile, the antenna element 1100 has a notch filter characteristic in which a return loss value increases in the frequency band of 30 to 35 GHz. Accordingly, the antenna element 1100 described herein operates to have dual resonance in the first band and the second band. Furthermore, the antenna element 1100 may operate as a notch filter in a band between the first band and the second band to block an interference signal in an adjacent band. Accordingly, the antenna 1100 described herein corresponds to a mmWave wideband dipole antenna having a notch filter characteristic.

Referring to FIGS. 4 to 9B and 10D, the gain characteristic of the antenna element 1100 has a gain value of 8.2 to 8.8 dBi in the frequency band of 24 to 30 GHz. Meanwhile, the gain characteristic of the antenna element 1100 has a gain value of 10.2 to 11.8 dBi in the frequency band of 35 to 50 GHz. On the contrary, a gain value of the antenna element 1100 rapidly decreases in the frequency band of 30 to 35 GHz. This is because, as described above, the antenna element 1100 has a notch filter characteristic in which a return loss value increases in the frequency band of 30 to 35 GHz. Accordingly, the antenna element 1100 described herein operates to have dual resonance in the first band and the second band. Furthermore, the antenna element 1100 may operate as a notch filter in a band between the first band and the second band to block an interference signal in an adjacent band.

Figure 11A:
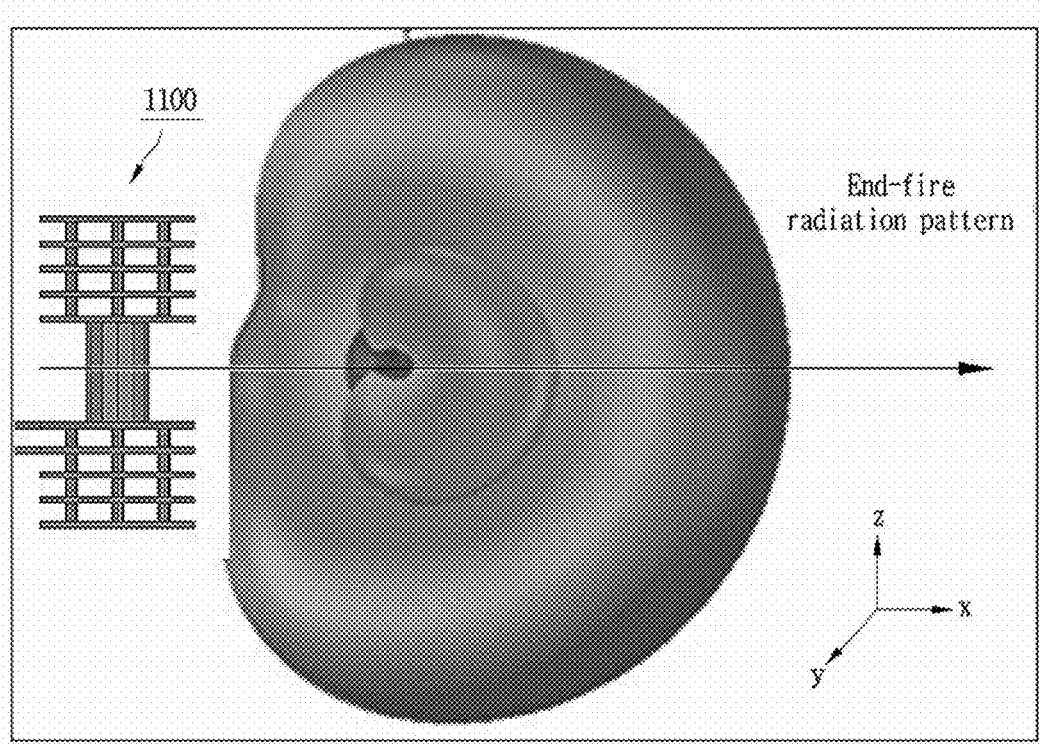
FIG. 11A shows a radiation pattern in a first band of an antenna element according to an embodiment. On the other hand.

The antenna module 1100 described herein may radiate a signal in a lateral direction. In this regard, FIG. 11A shows a radiation pattern in a first band of an antenna element according to an embodiment. On the other hand, FIG. 11B shows a radiation pattern in a second band of an antenna element according to an embodiment.

Referring to FIG. 11A, the radiation pattern of a signal radiated from the antenna module 1100 in the first band is formed as an end-fire radiation pattern. In this regard, referring to a radiation pattern in a yz-plane of the signal radiated from the antenna module 1100, an end-fire radiation pattern radiated in a lateral direction is formed. More specifically, a radiation pattern in the yz-plane of the signal radiated from the antenna module 1100 has a peak in a 0-degree direction with respect to the y-axis direction.

Figure 11B:
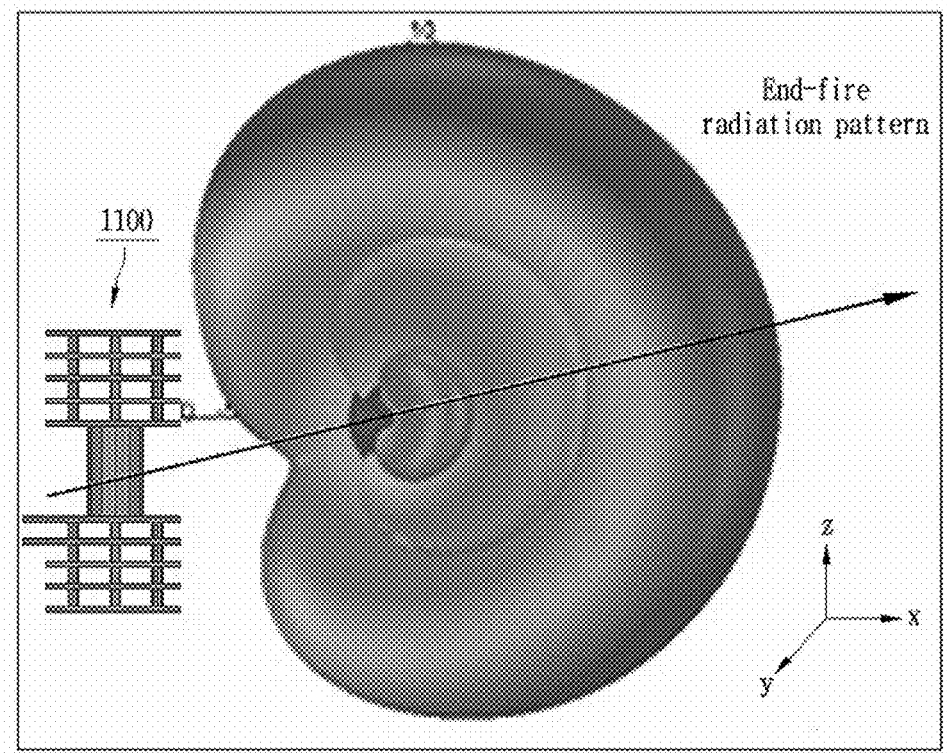
FIG. 11B shows a radiation pattern in a second band of an antenna element according to an embodiment.

Referring to FIG. 11B, the radiation pattern of a signal radiated from the antenna module 1100 in the first band is formed as an end-fire radiation pattern. In this regard, referring to a radiation pattern in a yz-plane of the signal radiated from the antenna module 1100, an end-fire radiation pattern radiated in a lateral direction is formed. More specifically, the radiation pattern in the yz-plane of the signal radiated from the antenna module 1100 has a peak in an upward direction by a predetermined angle with respect to the y-axis direction.

Accordingly, the antenna element 1100 described herein operates to have dual resonance in the first band and the second band. In this regard, in the antenna element 1100, both the radiation patterns in the first band and the second band are formed as an end-fire radiation pattern. More specifically, the antenna element 1100 is defined to have a similar radiation pattern in the first band and the second band. Accordingly, the electronic device including the antenna element 1100 may exhibit similar electrical characteristics even when switching bands.

Figure 12:
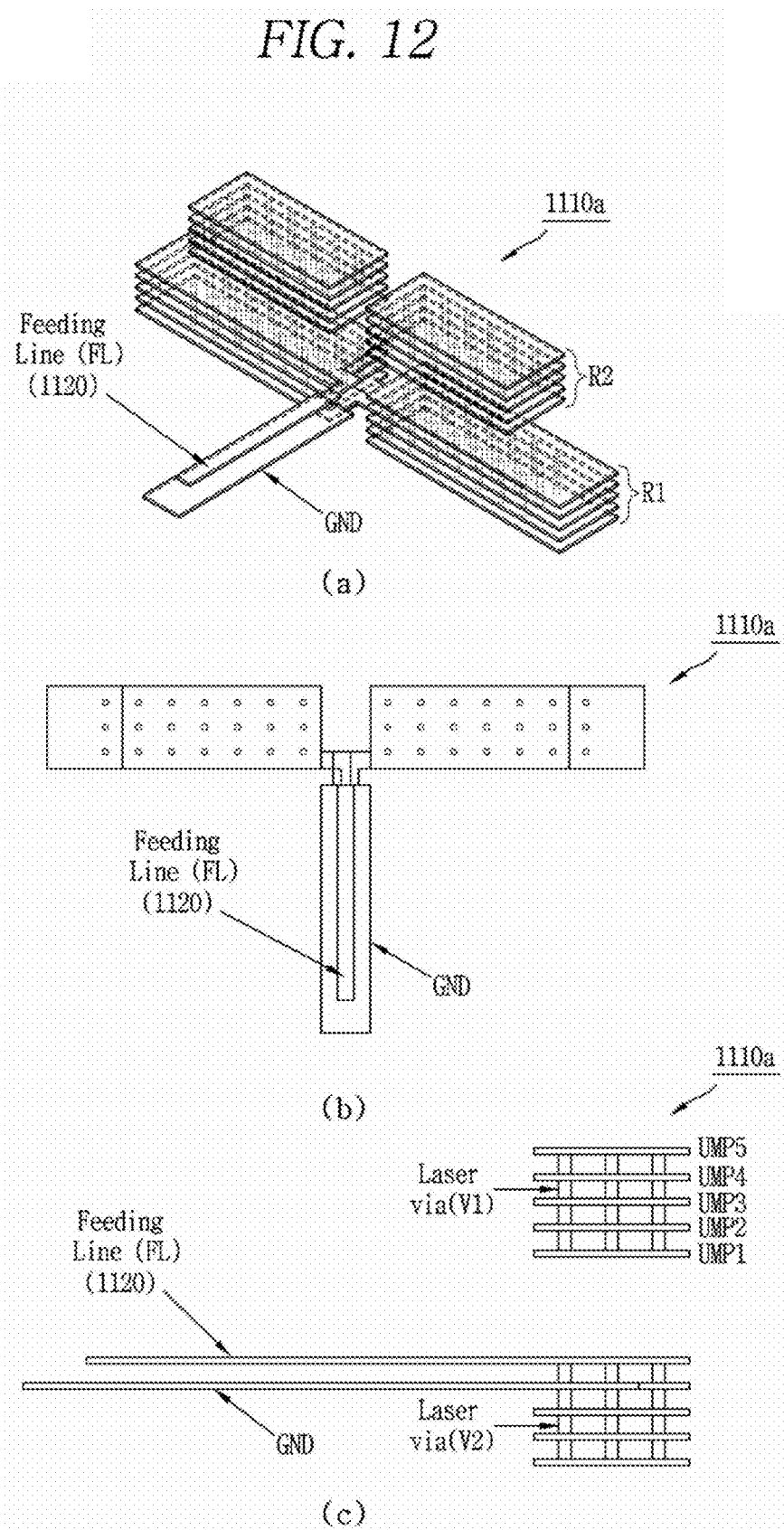
FIG. 12 is a perspective view, a front view, and a side view of an antenna module including a lower radiator and an upper radiator according to an embodiment.
Figure 13A:
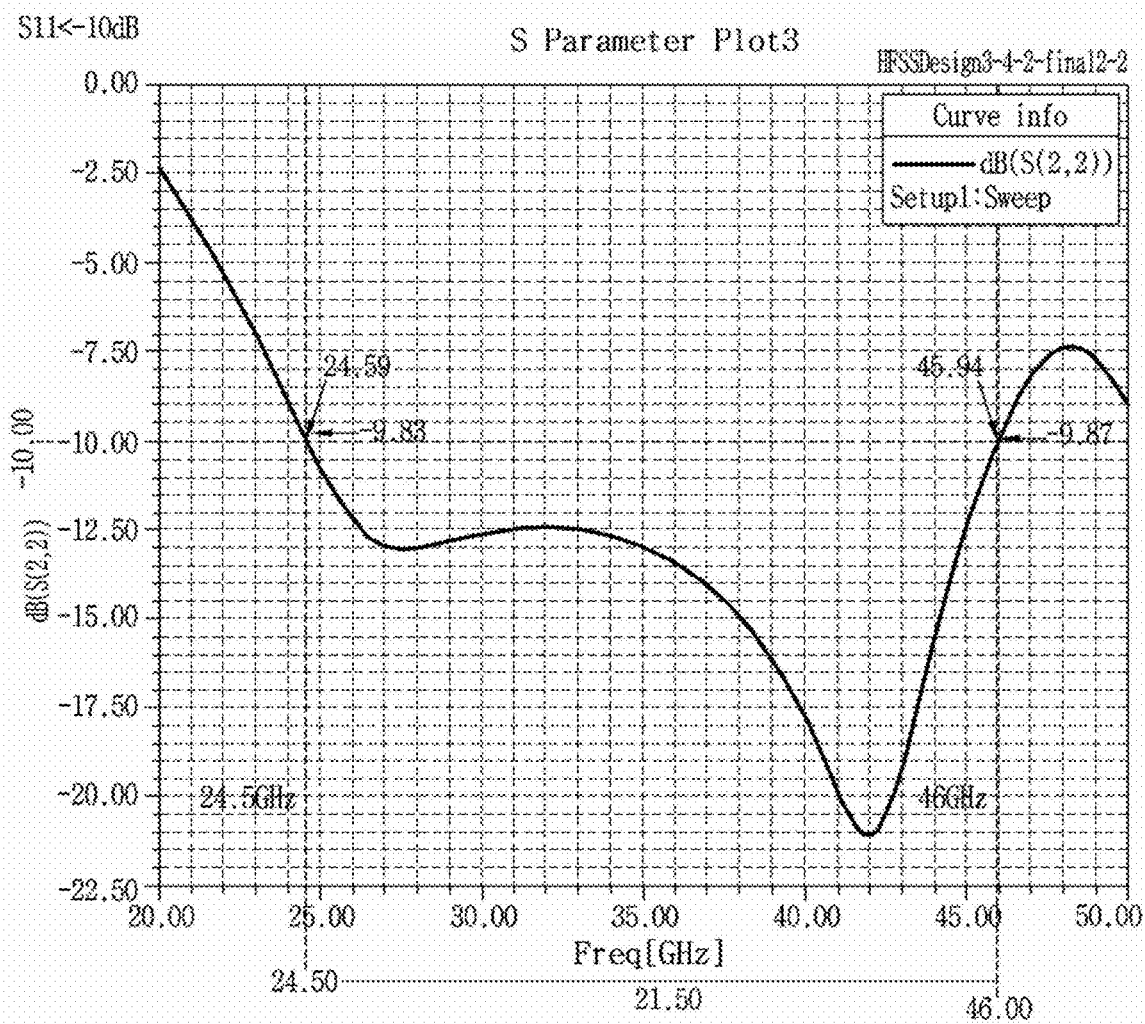
FIGS. 13A and 13B show reflection coefficient characteristics and an impedance chart of the antenna module of FIG. 12.
Figure 13B:
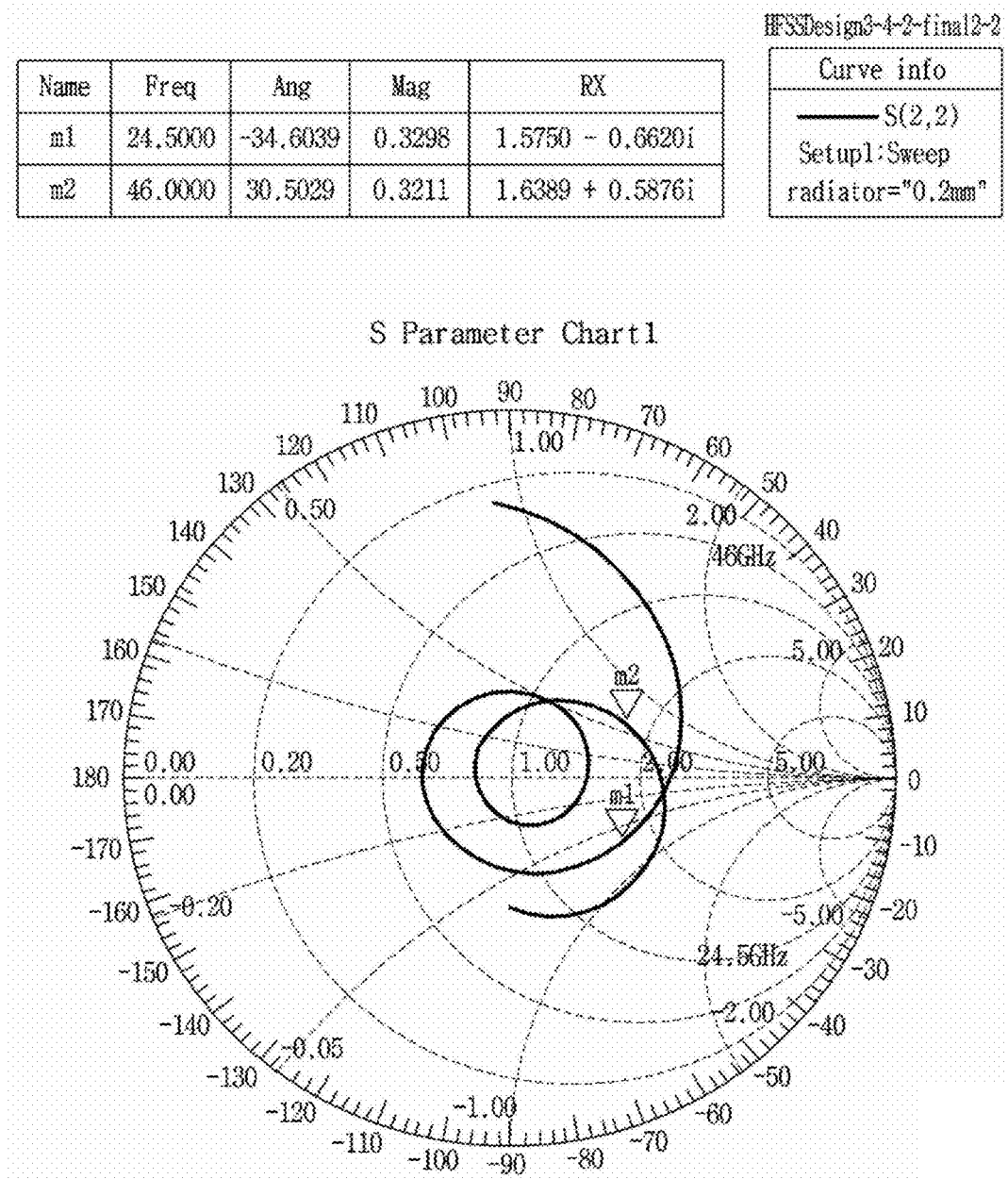

According to an embodiment, the antenna module may be configured not to include a via for interconnecting the lower radiator R1 and the upper radiator R2. Accordingly, the antenna module does not exhibit a notch filter characteristic while operating in a wide band through the lower radiator R1 and the upper radiator R2. In this regard, FIG. 12 is a perspective view, a front view, and a side view of an antenna module including a lower radiator and an upper radiator according to an embodiment. FIGS. 13A and 13B show reflection coefficient characteristics and an impedance chart of the antenna module of FIG. 12.

Referring to FIG. 12, even when there is no via in the core layer of the antenna element 1110a of the antenna module, it can operate as a wide band antenna. In this regard, the lower radiator R1 operates as an antenna by direct feeding, and the upper radiator R2 as an antenna by coupling feeding.

Referring to FIGS. 12 and 13A, the antenna element operates in a wide band at 24.5 to 46 GHz based on S11<−10 dB with no via. Referring to FIGS. 13A and 13B, when there is no via, the antenna element exhibits dual resonance characteristics while operating in a wide band at 24.5 to 46 GHz based on S11<−10 dB. However, since there is no via connecting the lower radiator R1 and the upper radiator R2, the antenna element does not exhibit a notch filter characteristic.

Figure 14A:
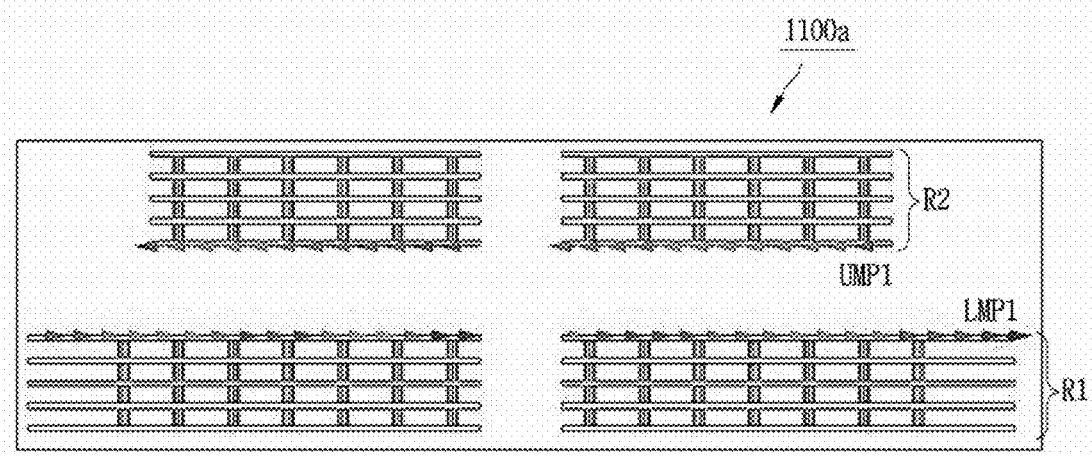
FIGS. 14A and 14B are a side view and a perspective view showing a current distribution diagram of an antenna module having upper/lower radiators that are not connected by vias.
Figure 14B:
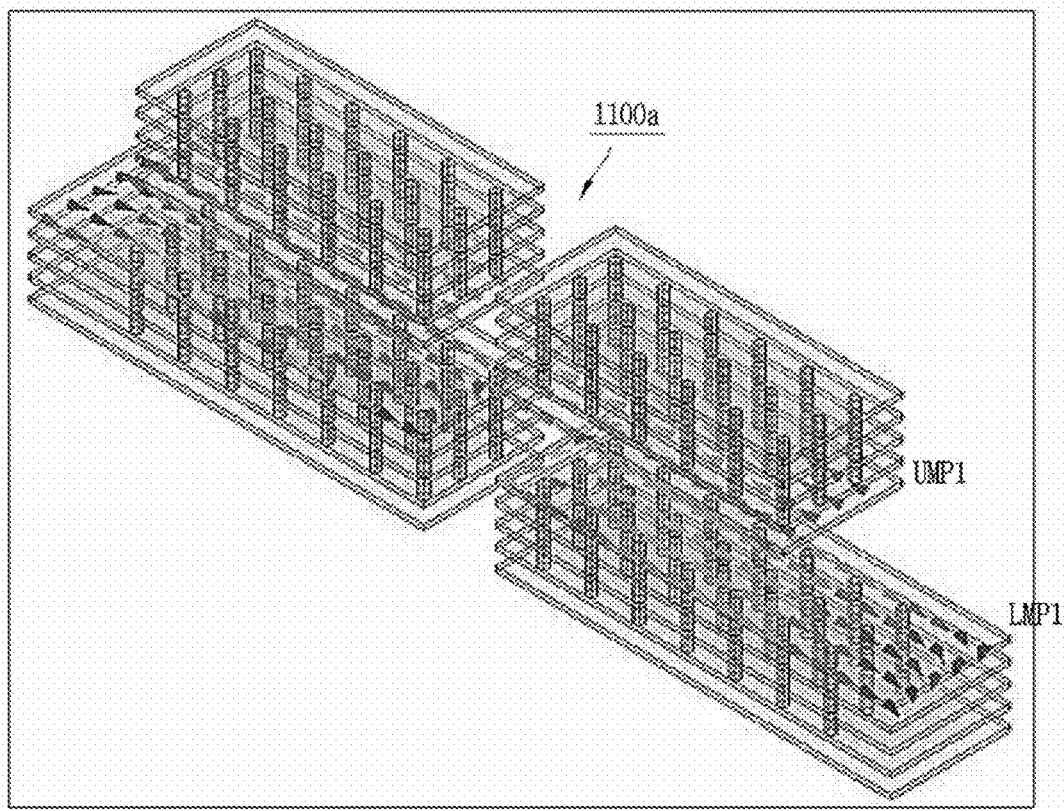

FIGS. 14A and 14B are a side view and a perspective view showing a current distribution diagram of an antenna module having upper/lower radiators that are not connected by vias. Referring to FIGS. 12, 14A, and 14B, there exists no via in the core layer connecting the lower radiator R1 and the upper radiator R2. Therefore, a strong current does not flow through the metal pattern LMP1 disposed at an upper end of the lower radiator R1 and the metal pattern UMP1 disposed at a lower end of the upper radiator R2. Currents in different directions exist due to a coupling between the metal patterns LMP1, UMP1, but strong currents are not generated. Accordingly, the antenna element 1100a operates well as a wide band antenna in all bands including the 30-35 GHz band.

Figure 15:
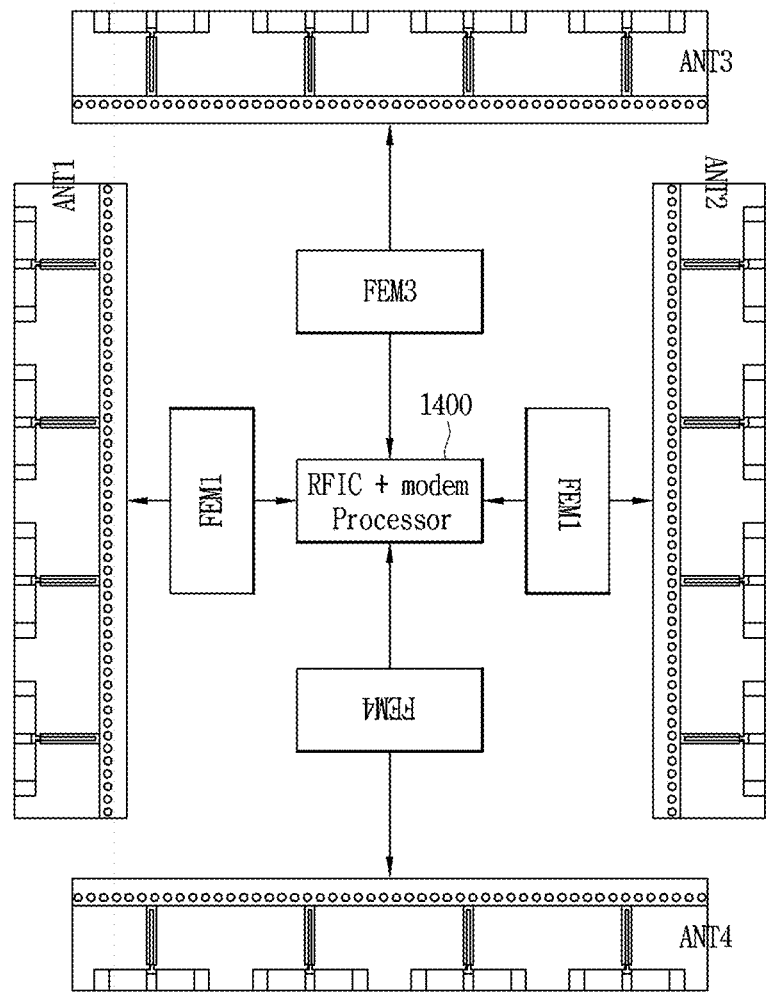
FIG. 15 shows a plurality of array antennas including a plurality of antenna elements including a plurality of antenna elements according to an embodiment and a configuration for controlling them.

According to an embodiment, a plurality of antenna modules may be disposed in the electronic device to perform multi-input multi-output. In this regard, FIG. 15 shows a plurality of array antennas including a plurality of antenna elements including a plurality of antenna elements according to an embodiment and a configuration for controlling them.

FIGS. 3B, 4 to 9C, 12 and 15, the plurality of array antennas may include a first antenna ANT1 to a fourth antenna ANT4. In this regard, the first antenna ANT1 to the fourth antenna ANT4 may be disposed on the left, right, upper and lower sides of the electronic device. However, positions at which the first antenna ANT1 to the fourth antenna ANT4 are disposed are not limited thereto and may be changed according to an application.

The first antenna ANT1 to the fourth antenna ANT4 may be operatively coupled to a first front-end module FEM1 to a fourth front-end module FEM4, respectively. In this regard, each of the first front-end module FEM1 to the fourth front-end module FEM4 may include a phase controller, a power amplifier, and a reception amplifier. Each of the first front-end module FEM1 to the fourth front-end module FEM4 may include some components of the transceiver circuit 1250 corresponding to the RFIC.

The processor 1400 may be operatively coupled to the first front-end module FEM1 to the fourth front-end module FEM4. The processor 1400 may include some components of the transceiver circuit 1250 corresponding to the RFIC. The processor 1400 may include the baseband processor 1400 corresponding to a modem. The processor 1400 may be provided in the form of a system-on-chip (SoC) to include some components of the transceiver circuit 1250 corresponding to the RFIC and the baseband processor 1400 corresponding to the modem. However, it is not limited to the configuration of FIG. 12 and may be changed in various ways according to an application.

Referring to FIGS. 3B, 4 to 9C, 12 and 15, the processor 1400 may control the first front-end module FEM1 to the fourth front-end module FEM4 to radiate a signal through at least one of the first antenna ANT1 to the fourth antenna ANT4. In this regard, an optimal antenna may be selected based on the quality of signals received through the first antenna ANT1 to the fourth antenna ANT4.

The processor 1400 may control the first front-end module FEM1 to the fourth front-end module FEM4 to perform multi-input multi-output (MIMO) through two or more of the first antenna ANT1 to the fourth antenna ANT4. In this regard, an optimal antenna combination may be selected based on the quality and interference level of signals received through the first antenna ANT1 to the fourth antenna ANT4.

The processor 1400 may control the first front-end module FEM1 to the fourth front-end module FEM4 to perform carrier aggregation (CA) through at least one of the first antenna ANT1 to the fourth antenna ANT4. In this regard, since each of the first antenna ANT1 to the fourth antenna ANT4 has dual resonance in the first band and the second band, carrier aggregation (CA) may be performed through one array antenna.

The processor 1400 may determine signal quality in the first band and the second band for each antenna. The processor 1400 may perform carrier aggregation (CA) through one antenna in the first band and another antenna in the second band, based on signal quality in the first band and the second band.

Various changes and modifications to the above-described embodiments related to an array antenna operating in a millimeter wave band and an electronic device controlling the same may be clearly understood by those skilled in the art within the concept and scope of the present disclosure. Accordingly, various changes and modifications to the embodiments are to be understood as falling within the scope of the following claims.

The electronic device described herein may simultaneously transmit or receive information from various entities, such as a peripheral electronic device, an external device, or a base station. Referring to FIGS. 1 to 15, the electronic device may perform multi-input multi-output (MIMO) through the antenna module 1100, the transceiver circuit 1250 controlling the same, and the baseband processor 1400. Multi-input multi-output (MIMO) may be performed to improve communication capacity and/or reliability of information transmission and reception. Accordingly, the electronic device may simultaneously transmit or receive different information from various entities to improve communication capacity. Accordingly, the communication capacity may be improved through the MIMO operation in the electronic device without extending the bandwidth.

Alternatively, the electronic device may simultaneously transmit or receive the same information from various entities to improve reliability for surrounding information and reduce latency. Accordingly, ultra-reliable low latency communication (URLLC) can be made in the electronic device, and the electronic device may operate as a URLLC UE. To this end, a base station performing scheduling may preferentially allocate a time slot for an electronic device operating as a URLLC UE. For this purpose, some of specific time-frequency resources already allocated to other UEs may be punctured.

As described above, the plurality of array antennas ANT1 to ANT4 may operate in a wide band in a first frequency band that is a 28 GHz band and a second frequency band that is a 38.5 GHz band. The baseband processor 1400 may perform multi-input multi-output (MIMO) through some of the plurality of antenna elements ANT1 to ANT4 in the first frequency band. Furthermore, the baseband processor 1400 may perform multi-input multi-output (MIMO) through some of the plurality of antenna elements ANT1 to ANT4 in the second frequency band. In this regard, multi-input multi-output (MIMO) may be performed using array antennas spaced apart from each other by a sufficient distance and rotated at a predetermined angle. Accordingly, there is an advantage capable of improving an isolation between a first signal and a second signal within the same band.

At least one array antenna among the first antenna ANT1 to the fourth antenna ANT4 in the electronic device may operate as a radiator in the first frequency band. Meanwhile, one or more array antennas among the first to fourth antennas ANT1 to ANT4 may operate as a radiator in the second frequency band.

According to an embodiment, the baseband processor 1400 may perform multi-input multi-output (MIMO) through two or more array antennas among the first antenna ANT1 to the fourth antenna ANT4 in the first frequency band. Meanwhile, the baseband processor 1400 may perform multi-input multi-output (MIMO) through two or more array antennas among the first antenna ANT1 to the fourth antenna ANT4 in the second frequency band.

In this regard, the baseband processor 1400 may transmit a time/frequency resource request of the second frequency band to the base station when the signal quality of the two or more array antennas in the first frequency band are all below a threshold value. Accordingly, when a time/frequency resource of the second frequency band is allocated, the baseband processor 1400 may perform multi-input multi-output (MIMO) through the two or more array antennas among the first antenna ANT1 to the fourth antenna ANT4 through the relevant resource.

Even when the resource of the second frequency band is allocated, multi-input multi-output (MIMO) may be performed using the same two or more array antennas. Accordingly, as the array antenna is changed, the relevant front-end module (FEM) may be turned on/off again, thereby preventing power consumption. Furthermore, as the array antenna is changed, the relevant front-end module (FEM) may be turned on/off again, thereby preventing performance degradation due to a settling time of an electronic component, for instance, an amplifier.

Meanwhile, when the resource of the second frequency band is allocated, at least one of the two or more array antennas is changed to perform multi-input multi-output (MIMO) through the relevant array antennas. Accordingly, when it is determined that communication through the relevant array antenna is difficult due to different propagation environments in the first and second frequency bands, another array antenna may be used.

According to another embodiment, the baseband processor 1400 may control the transceiver circuit 1250 to receive a second signal of the second band while receiving a first signal of the first band through one of the first antenna ANT1 to the fourth antenna ANT4. In this case, there is an advantage capable of performing carrier aggregation (CA) through one antenna.

Accordingly, the baseband processor 1400 may perform carrier aggregation (CA) through a band in which the first frequency band and the second frequency band are combined. Accordingly, in the present disclosure, when it is necessary to transmit or receive a large amount of data in an electronic device, there is an advantage capable of enabling wide band reception through carrier aggregation.

Accordingly, the electronic device may perform enhanced mobile broad band (eMBB) communication and the electronic device may operate as an eMBB UE. To this end, a base station performing scheduling may allocate a wide band frequency resource for an electronic device operating as an eMBB UE. For this purpose, carrier aggregation (CA) may be performed on spare frequency bands except for frequency resources already allocated to other UEs.

Various changes and modifications to the above-described embodiments related to an array antenna operating in a millimeter wave band and an electronic device controlling the same may be clearly understood by those skilled in the art within the concept and scope of the present disclosure. Accordingly, various changes and modifications to the embodiments are to be understood as falling within the scope of the following claims.

In the above, an array antenna operating in a millimeter wave band according to the present disclosure and an electronic device controlling the same have been described. A wireless communication system including an array antenna operating in such a millimeter wave band, an electronic device controlling the same, and a base station will be described as follows. In this regard, FIG. 16 illustrates a block diagram of a wireless communication system that is applicable to methods proposed herein.

Figure 16:
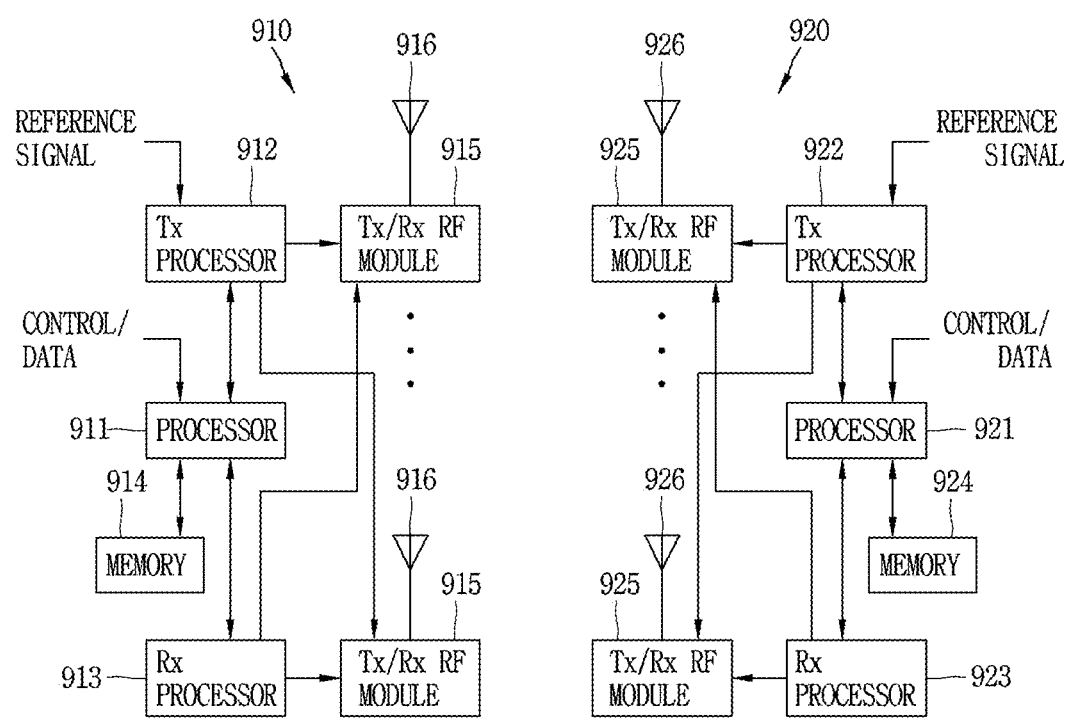
FIG. 16 illustrates a block diagram of a wireless communication system that is applicable to methods proposed herein.

Referring to FIG. 16, the wireless communication system includes a first communication device 910 and/or a second communication device 920. "A and/or B" may be interpreted to denote the same as "including at least one of A and B". The first communication device may represent a base station, and the second communication device may represent a terminal (or the first communication device may represent a terminal or a vehicle, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, a machine-to-machine (M2M) device, a device-to-device (D2D) device, a vehicle, a robot, an AI module or the like.

The first communication device and the second communication device include processors 911, 921, memories 914, 924, one or more Tx/Rx radio frequency modules 915, 925, Tx processors 912, 922, Rx processors 913, 923, and antennas 916, 926. The processor implements functions, processes, and/or methods described above. More specifically, in the DL (communication from a first communication device to a second communication device), an upper layer packet from the core network is provided to the processor 911. The processor implements functions of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. The each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

In the above, an array antenna operating in a millimeter wave band and an electronic device controlling the same have been described. The technical effects of an array antenna operating in such a millimeter wave band and an electronic device controlling the same will be described as follows.

According to an embodiment, an electronic device including an antenna module in which an array antenna operating in a millimeter wave band is disposed, a transceiver circuit controlling the same, and a modem may be provided.

Another aspect of the present disclosure is to provide an antenna structure in which an upper radiator and a lower radiator are disposed to have different lengths and are connected by vertical vias to operate in a wide band so as to cover a plurality of bands in a millimeter wave band with one antenna.

According to an embodiment, an antenna structure that operates as a notch filter in a band between a plurality of bands in a millimeter wave band using an upper radiator and a lower radiator connected by vertical vias.

According to an embodiment, multi-input multi-output (MIMO) may be performed using an antenna structure that operates in a wide band to cover a plurality of bands in a millimeter wave band with one antenna.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the present disclosure described above, design and operations of an array antenna operating in a millimeter wave band and an electronic device controlling the same can be implemented as computer-readable codes on a program-recorded medium. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a controller of the terminal. Therefore, it should also be understood that the above-described embodiments are not limited by any of the details of the foregoing description, unless otherwise specified, but rather should be construed broadly within its scope as defined in the appended claims.

The scope of the invention should be determined by reasonable interpretation of the appended claims and all changes that come within the equivalent scope of the invention are included in the scope of the invention.

The invention claimed is:

1. An electronic device including an antenna, the electronic device comprising:
   a first radiator configured by stacking metal patterns having a predetermined width and length on different layers of a multi-layer substrate;
   a second radiator configured by stacking metal patterns having a predetermined width and length above the first radiator;
   a vertical via configured to interconnect a metal pattern disposed at an upper portion of the first radiator and a metal pattern disposed at a lower portion of the second radiator;
   first vertical vias spaced apart from each other and configured to interconnect the metal patterns of adjacent layers of the first radiator in one axial direction and the other axial direction perpendicular to the one axial direction;
   second vertical vias spaced apart from each other and configured to interconnect the metal patterns of adjacent layers of the second radiator in one axial direction and the other axial direction;
   a feeding line connected to one of first metal patterns disposed on an uppermost layer of the first radiator, wherein an end portion of the feeding line is connected to a first metal pattern disposed at one side of the first metal patterns;
   a ground line connected to any one of second metal patterns disposed under the first metal patterns, wherein an end portion of the ground line is connected to a second metal pattern disposed at the other side of the second metal patterns;
   a ground wall configured to connect the multi-layer substrate, and spaced apart from the first radiator; and
   a transceiver circuit configured to be connected to the first metal pattern of the first radiator through a feeding line,
   wherein the first metal patterns and the feeding line are disposed on a first layer that is an uppermost layer of the multi-layer substrate and a multi-layer circuit substrate, respectively, and
   wherein the ground line is disposed on a second layer that is a layer adjacent to the uppermost layer of the multi-layer circuit substrate, and
   wherein a height of the ground wall is defined to be higher than that of the multi-layer circuit substrate.

2. The electronic device of claim 1, wherein a length of the metal patterns disposed on each layer of the first radiator is disposed to have a first length, and
   wherein a length of the metal patterns disposed on each layer of the second radiator is disposed to have a second length larger than the first length.

3. The electronic device of claim 2, wherein the metal patterns disposed on each layer of the first radiator are all disposed to have a first length that is the same length, and
   wherein the metal patterns disposed on each layer of the second radiator are all disposed to have a second length that is the same length.

4. The electronic device of claim 1, wherein an antenna element comprising the first radiator and the second radiator is configured to operate in a first band and a second band higher than the first band,
   wherein a current intensity formed in the metal patterns of the first radiator that is a lower radiator in the first band is distributed to be higher than that formed in the metal patterns of the second radiator that is an upper radiator, and wherein a current intensity formed in the metal patterns of the second radiator in the second band is distributed to be higher than that formed in the metal patterns of the first radiator.

5. The electronic device of claim 1, wherein an antenna element comprising the first radiator and the second radiator constitutes an array antenna in which a plurality of antenna elements are disposed to be spaced apart from each other by a predetermined distance, the electronic device further comprising:
- a baseband processor operatively coupled to the transceiver circuit and configured to control a phase of a signal applied to each antenna element of the array antenna via the transceiver circuit.

6. An antenna module provided in an electronic device, the antenna module comprising:
- a lower radiator configured by stacking metal patterns having a predetermined width and length on different layers of a multi-layer substrate;
- an upper radiator configured by stacking metal patterns having a predetermined width and length above the first radiator;
- a feeding line disposed on any one layer of a multi-layer circuit substrate, and configured to be connected to a first metal pattern disposed at one side of first metal patterns disposed on an uppermost layer of the lower radiator;
- a ground line connected to any one of second metal patterns disposed under the first metal patterns, wherein an end portion of the ground line is connected to a second metal pattern disposed at the other side of the second metal patterns;
- a vertical via configured to interconnect a metal pattern disposed at an upper portion of the first radiator and a metal pattern disposed at a lower portion of the second radiator;
- first vertical vias spaced apart from each other and configured to interconnect the metal patterns of adjacent layers of the first radiator in one axial direction and the other axial direction perpendicular to the one axial direction;
- second vertical vias spaced apart from each other and configured to interconnect the metal patterns of adjacent layers of the second radiator in one axial direction and the other axial direction;
- a ground wall configured to connect the multi-layer substrate, and spaced apart from the first radiator; and wherein the first metal patterns and the feeding line are disposed on a first layer that is an uppermost layer of the multi-layer substrate and the multi-layer circuit substrate, respectively, and wherein the ground line is disposed on a second layer that is a layer adjacent to the uppermost layer of the multi-layer circuit substrate, and wherein a height of the ground wall is defined to be higher than that of the multi-layer circuit substrate.

7. The antenna module of claim 6, wherein a length of the metal patterns disposed on each layer of the first radiator is disposed to have a first length, and
wherein a length of the metal patterns disposed on each layer of the second radiator is disposed to have a second length larger than the first length.

8. The antenna module of claim 6, wherein the metal patterns disposed on each layer of the first radiator are all disposed to have a first length that is the same length, and
wherein the metal patterns disposed on each layer of the second radiator are all disposed to have a second length that is the same length.

9. The antenna module of claim 6, wherein an antenna element comprising the first radiator and the second radiator is configured to operate in a first band and a second band higher than the first band,
wherein a current intensity formed in the metal patterns of the first radiator that is a lower radiator in the first band is distributed to be higher than that formed in the metal patterns of the second radiator that is an upper radiator, and
wherein a current intensity formed in the metal patterns of the second radiator in the second band is distributed to be higher than that formed in the metal patterns of the first radiator.

10. The antenna module of claim 6, wherein an antenna element comprising the first radiator and the second radiator constitutes an array antenna in which a plurality of antenna elements are disposed to be spaced apart from each other by a predetermined distance, the antenna module further comprising:
- a baseband processor operatively coupled to the transceiver circuit and configured to control a phase of a signal applied to each antenna element of the array antenna via the transceiver circuit.

* * * * *